(12) United States Patent
Rohit Kumar et al.

(10) Patent No.: US 11,445,286 B1
(45) Date of Patent: Sep. 13, 2022

(54) WIRELESS CONNECTION MANAGEMENT

(71) Applicant: Amazon Technologies, Inc., Seattle, WA (US)

(72) Inventors: Fnu Rohit Kumar, San Jose, CA (US); Snehalata Joshi, Fremont, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/325,733

(22) Filed: May 20, 2021

(51) Int. Cl.
  *H04R 1/10* (2006.01)
  *H04R 5/033* (2006.01)

(52) U.S. Cl.
  CPC ........... *H04R 1/1041* (2013.01); *H04R 5/033* (2013.01); *H04R 2420/07* (2013.01)

(58) Field of Classification Search
  CPC .............................. H04R 1/1041; H04R 5/033
  See application file for complete search history.

(56) References Cited

U.S. PATENT DOCUMENTS

| | | | | |
|---|---|---|---|---|
| 10,432,773 | B1* | 10/2019 | Tong | H04M 1/6066 |
| 10,630,421 | B1* | 4/2020 | Jorgovanovic | H04L 65/4069 |
| 10,840,995 | B1* | 11/2020 | Luong | H04B 17/318 |
| 2018/0035246 | A1* | 2/2018 | Orescanin | H04L 65/605 |
| 2018/0176717 | A1 | 6/2018 | Fu et al. | |
| 2019/0082371 | A1* | 3/2019 | Burt | H04W 36/30 |
| 2019/0268682 | A1* | 8/2019 | Li | H04R 5/033 |
| 2020/0053611 | A1* | 2/2020 | Jorgovanovic | H04W 36/03 |
| 2020/0053612 | A1* | 2/2020 | Jorgovanovic | H04W 76/15 |
| 2020/0196070 | A1* | 6/2020 | Dickman | H04R 25/558 |
| 2020/0196372 | A1* | 6/2020 | Ouyang | H04W 76/25 |
| 2021/0050960 | A1* | 2/2021 | Jang | H04L 5/0055 |

FOREIGN PATENT DOCUMENTS

| | | |
|---|---|---|
| WO | 20200019847 A1 | 1/2020 |
| WO | 20200117404 A1 | 6/2020 |
| WO | 202000124581 A1 | 6/2020 |

OTHER PUBLICATIONS

International Search Report and Written Opinion dated Jul. 11, 2022 issued in International Application No. PCT/US2022/022424, filed Mar. 30, 2022.

* cited by examiner

*Primary Examiner* — Simon King
(74) *Attorney, Agent, or Firm* — Pierce Atwood LLP

(57) ABSTRACT

A system and method to manage handover between wireless audio devices (such as earbuds) of primary responsibility for communicating with a third device such as a phone or tablet. A first wireless audio output device manages communications between a third device and a second wireless audio output device. The wireless audio output devices determine the signal quality of the connection between them. If that signal quality drops below a threshold, the wireless audio output devices determine the rate of change of that signal quality. If that quality is dropping rapidly, the wireless audio output devices check to see which has the better connection to the third device. If the second wireless audio output device has a better connection to the third device than that of the first wireless audio output device, then the wireless audio output devices can trigger a handover from the first wireless audio output device to the second wireless audio output device.

20 Claims, 13 Drawing Sheets

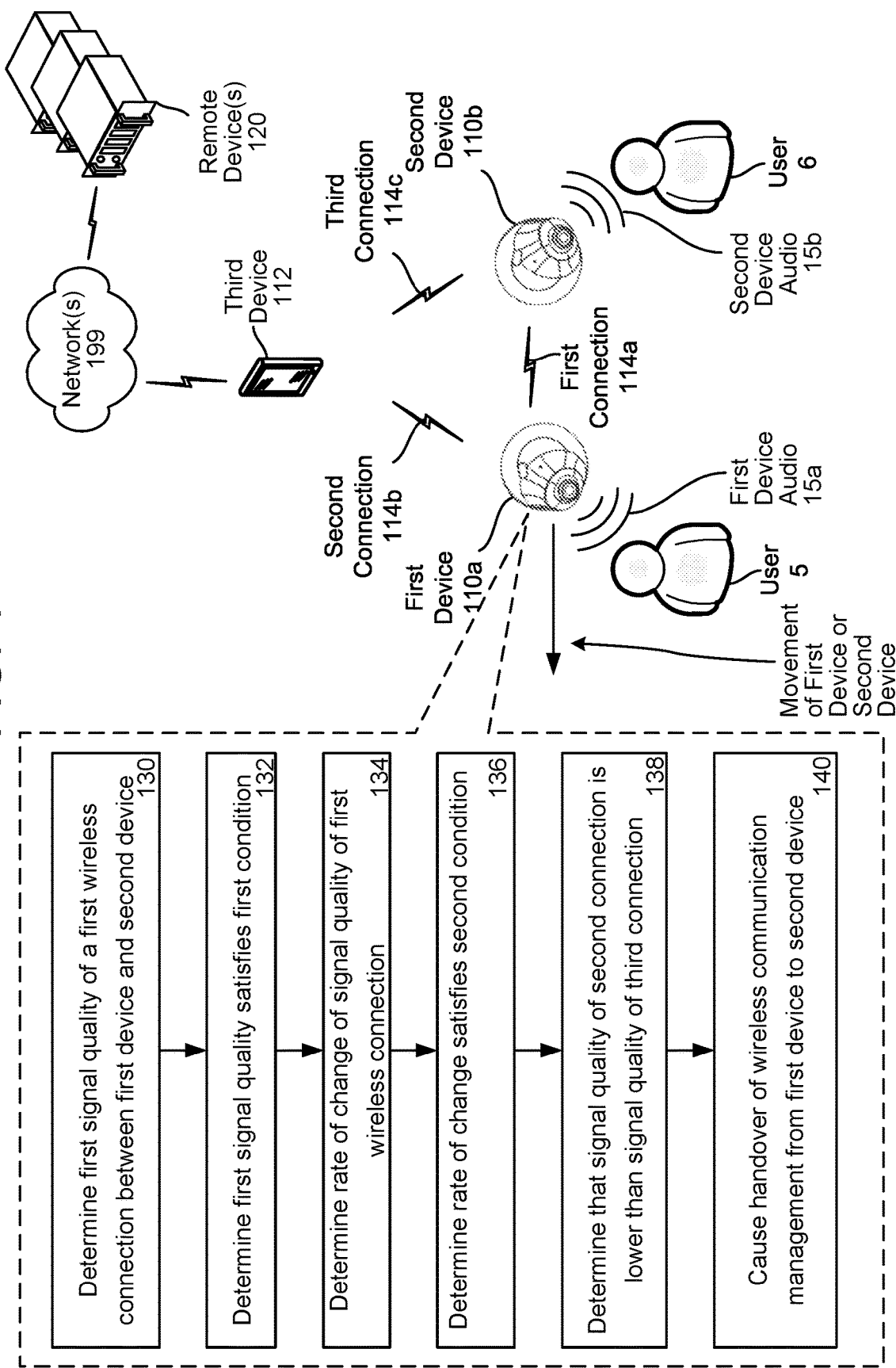

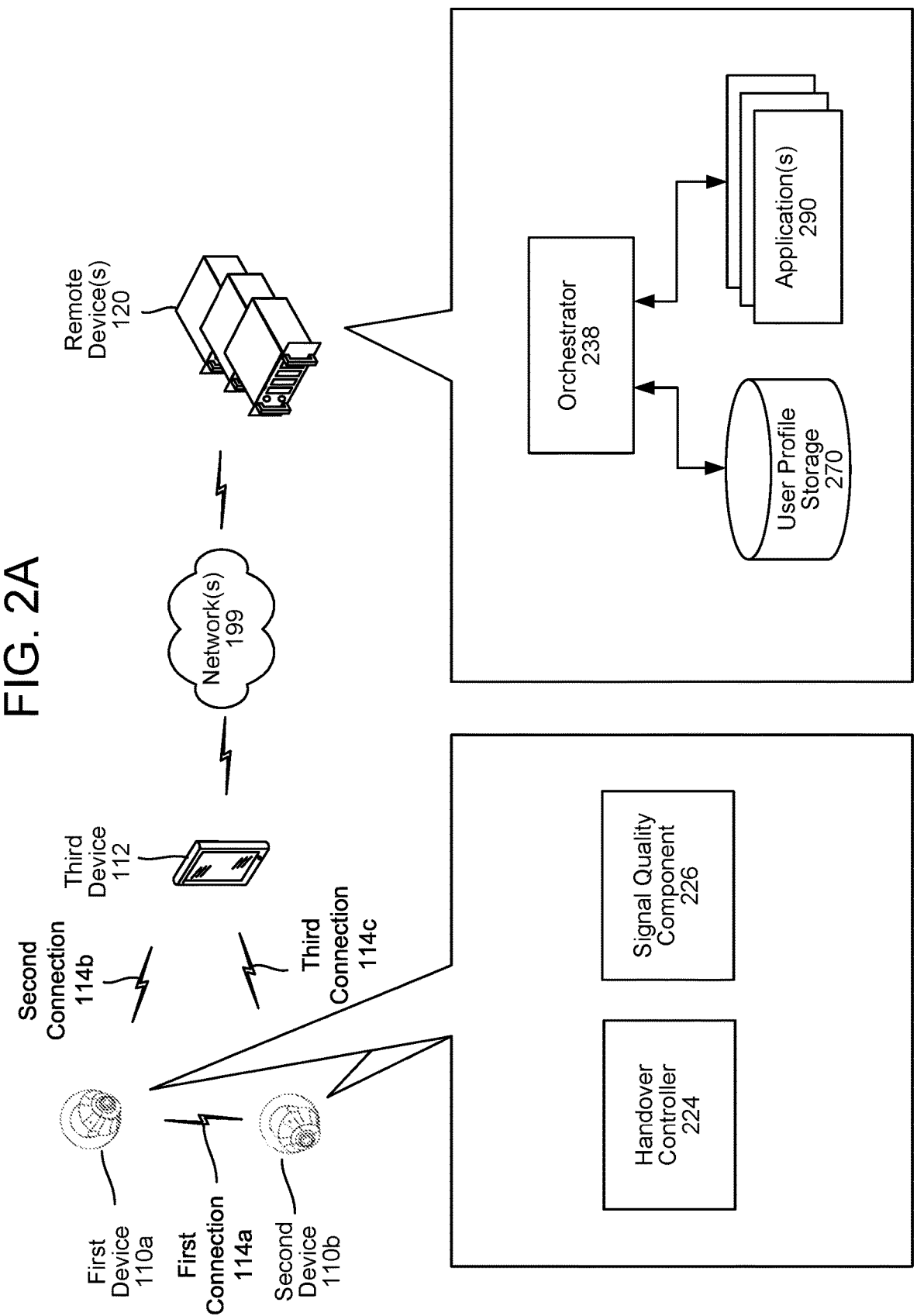

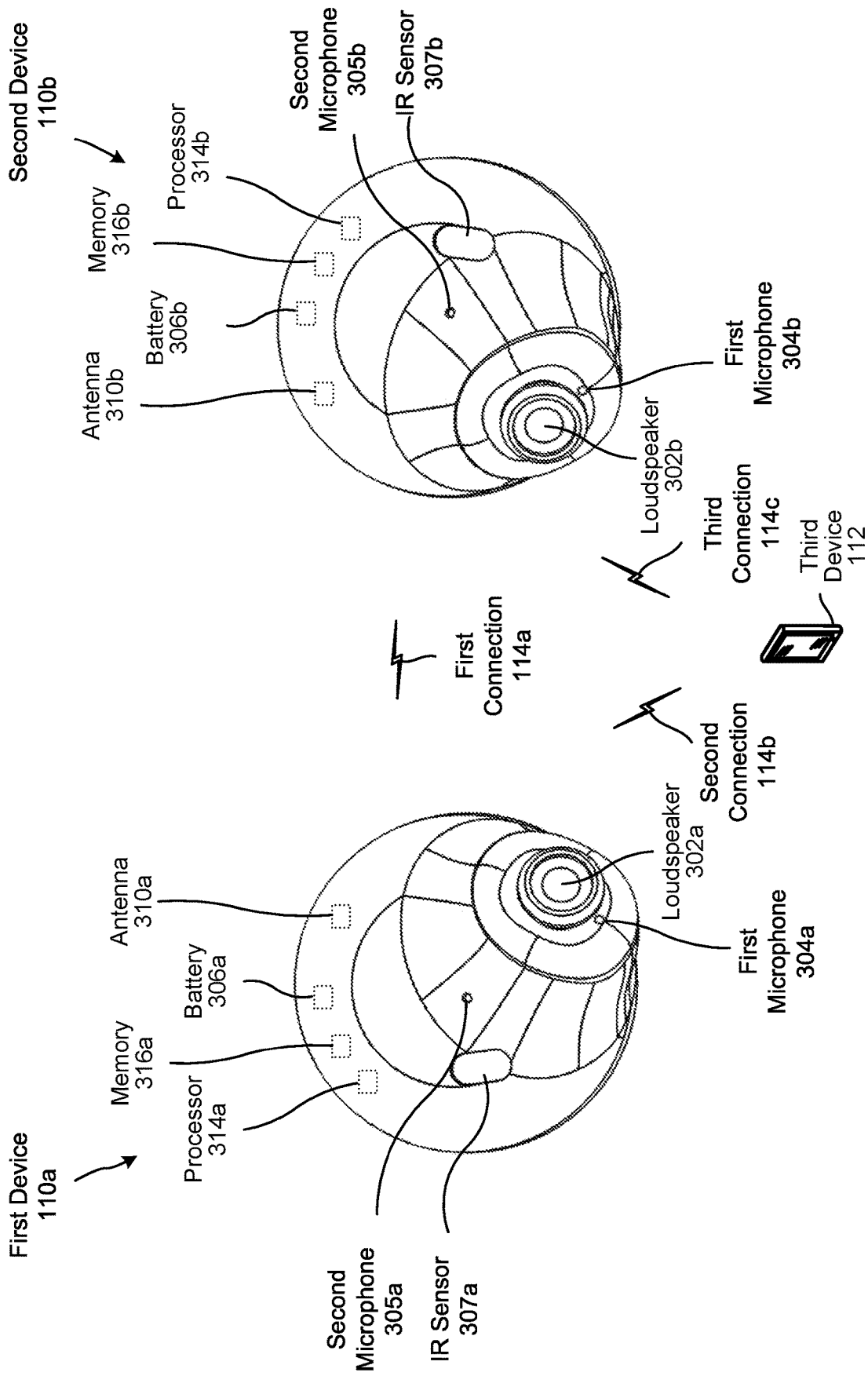

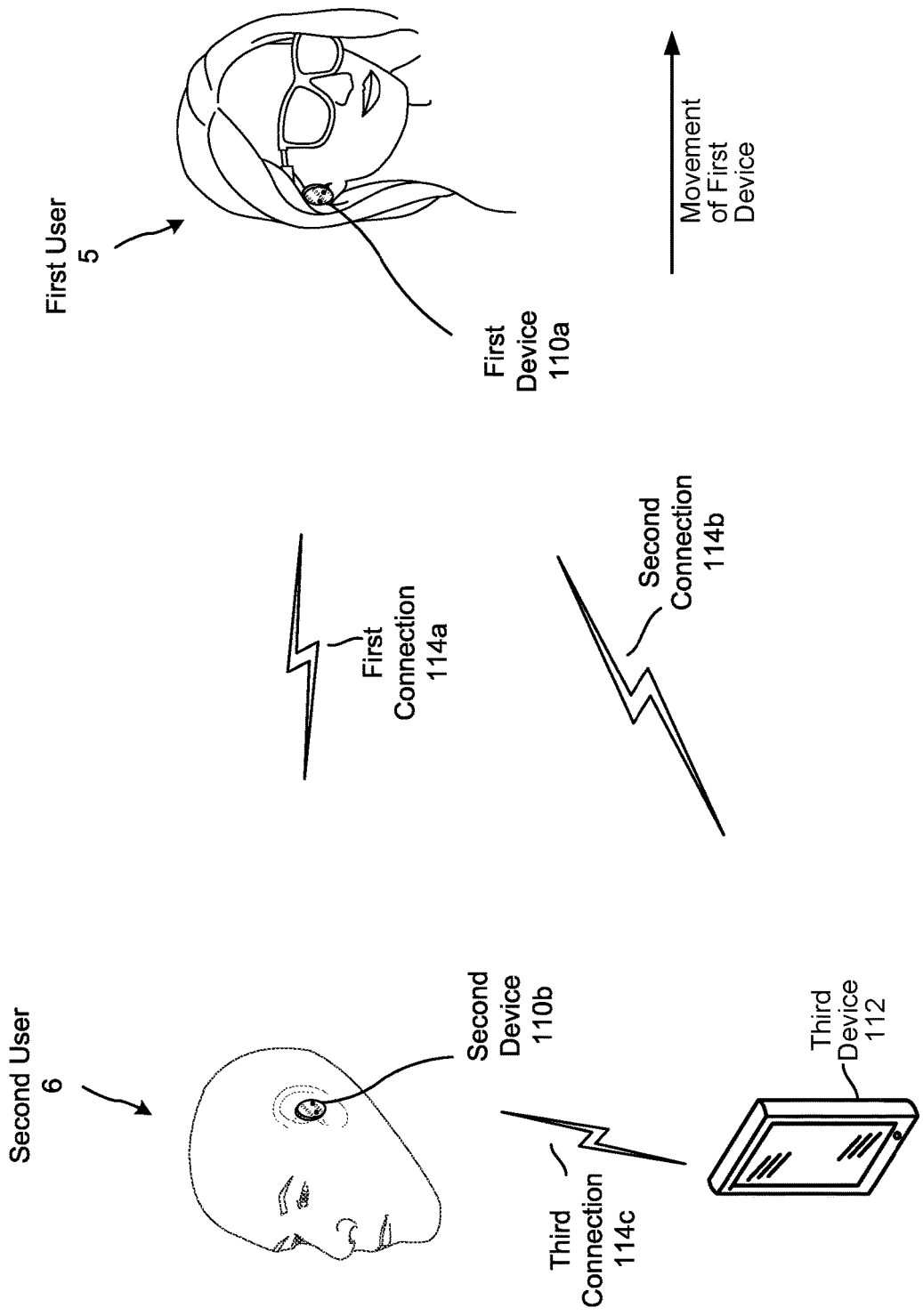

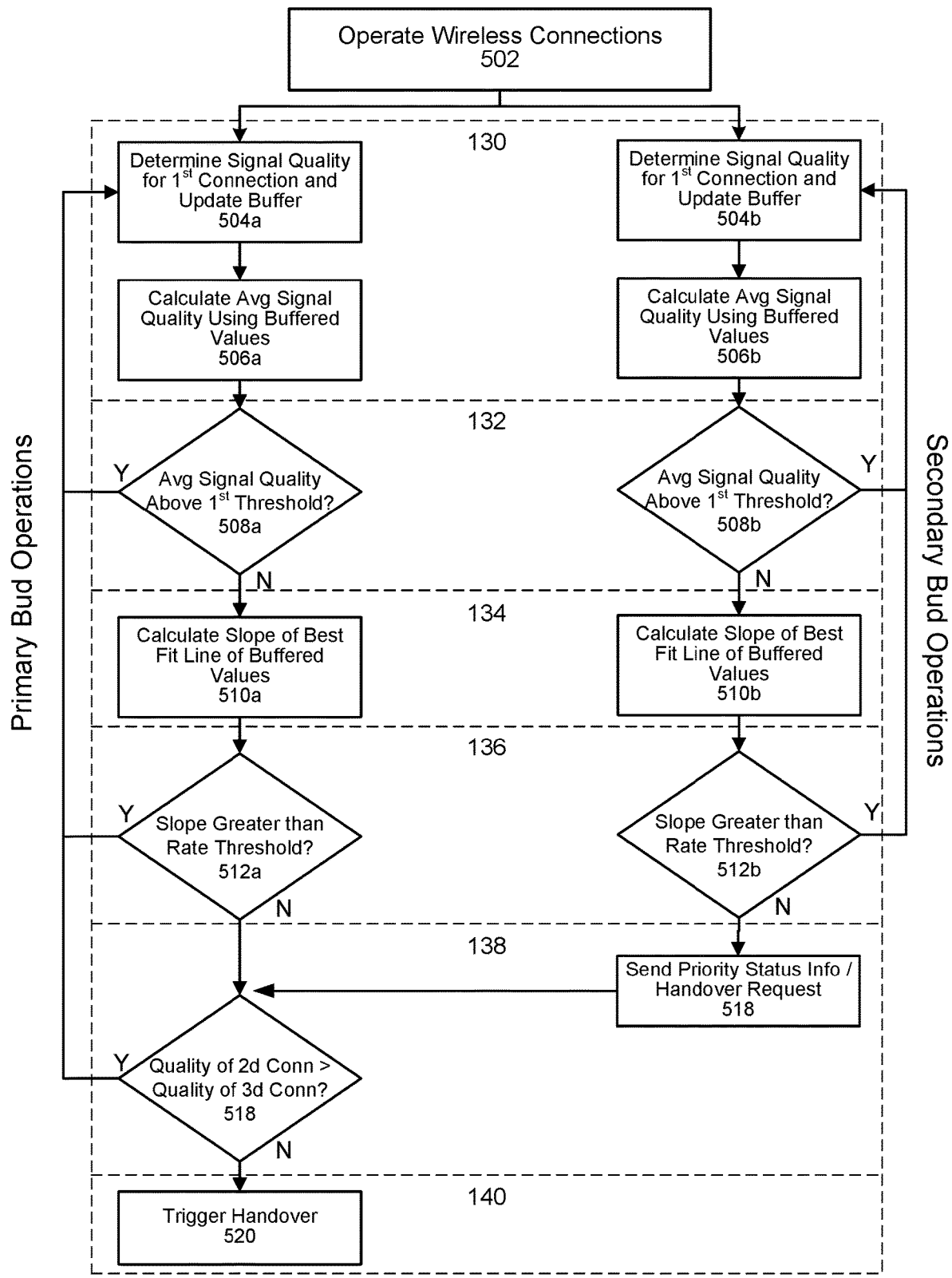

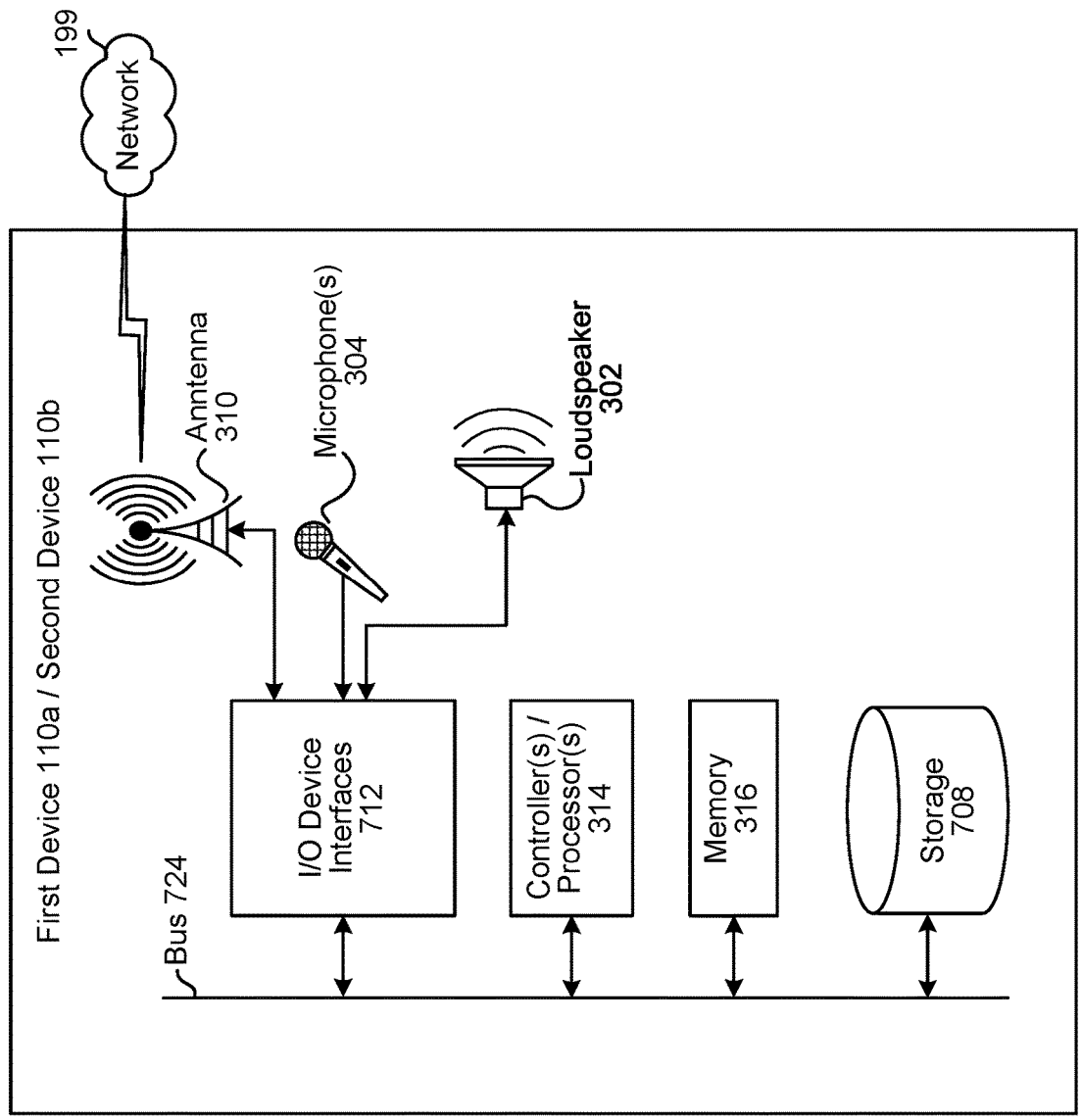

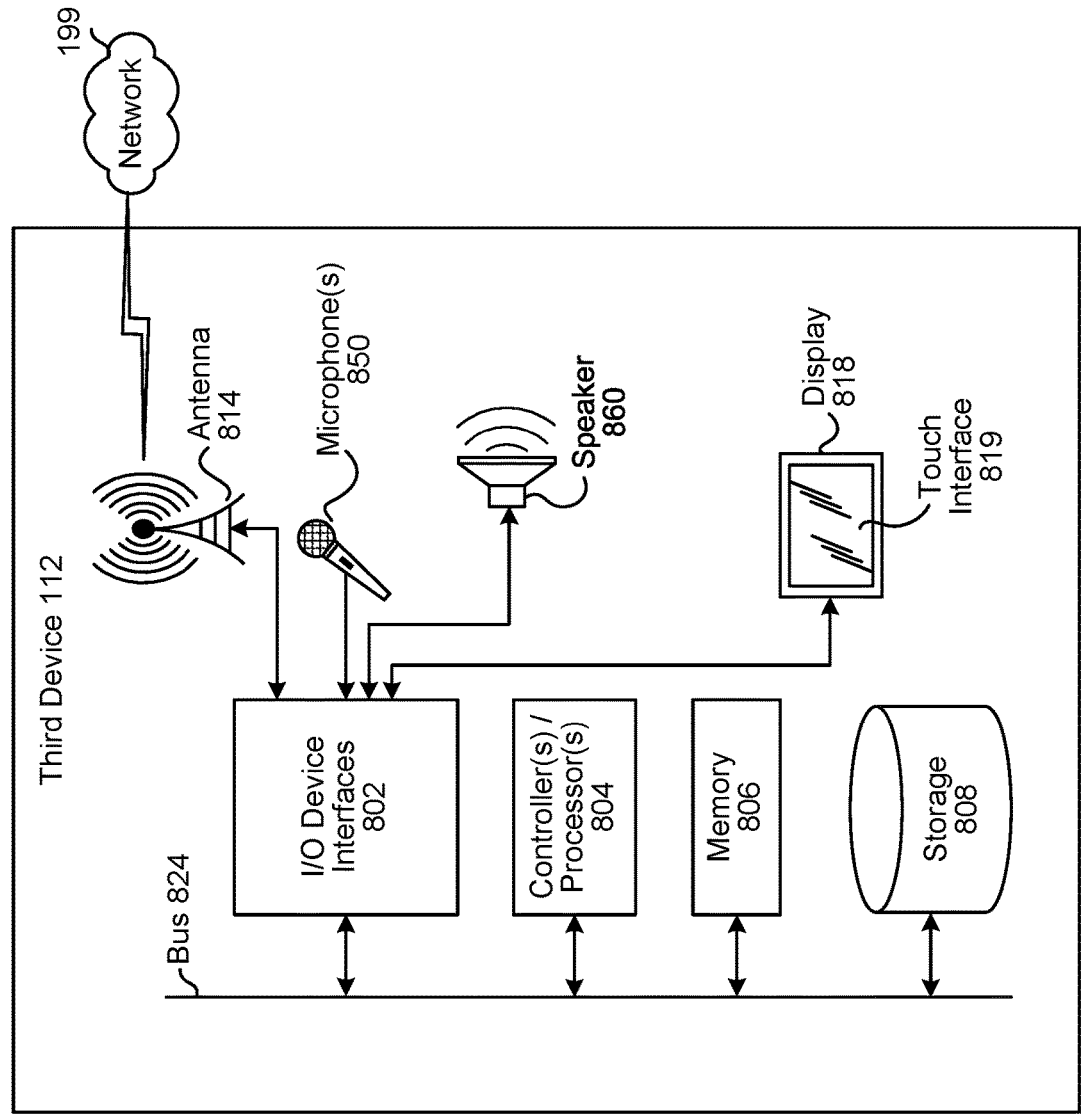

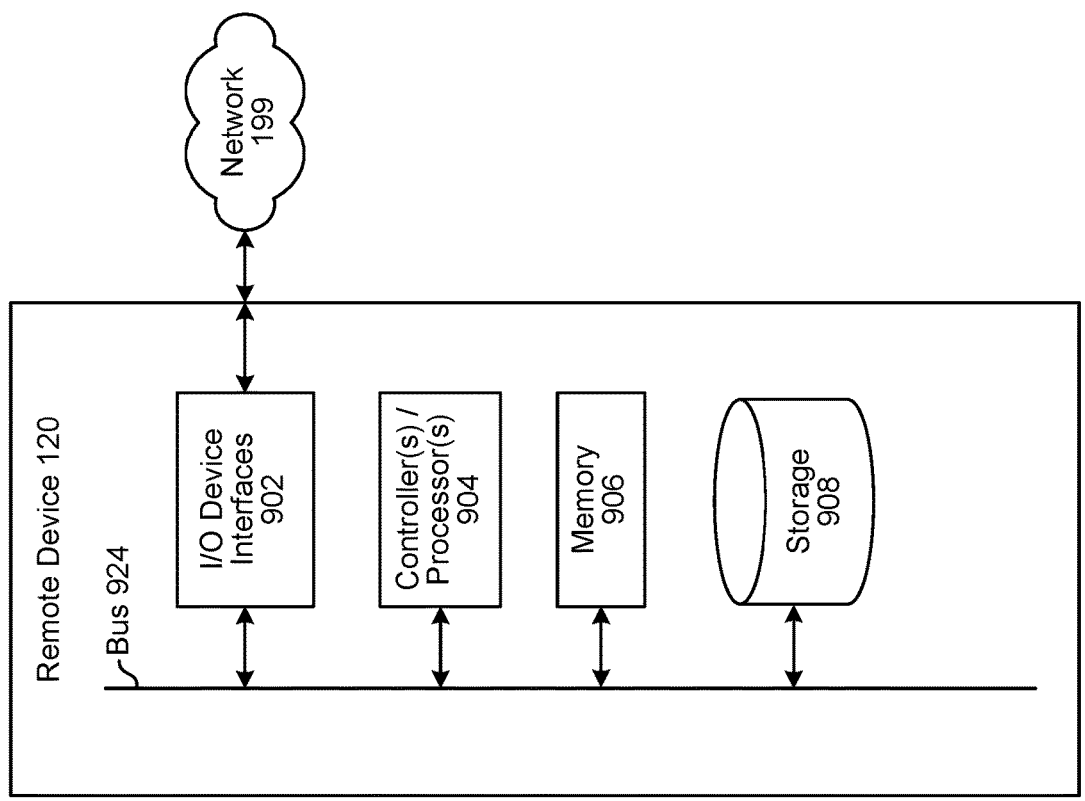

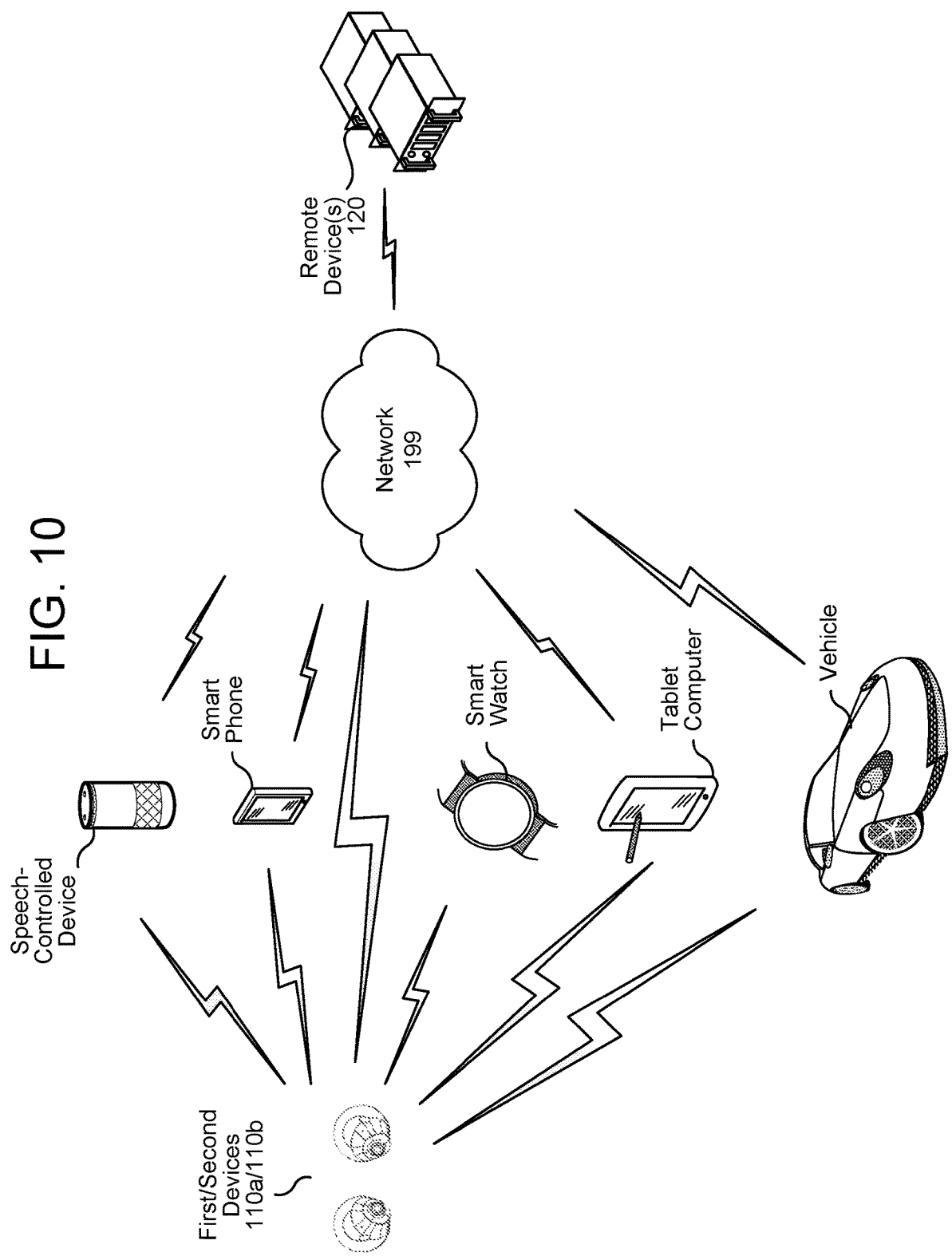

WIRELESS CONNECTION MANAGEMENT

BACKGROUND

Wireless audio devices, such as earbuds or headphones, may be used to communicate wirelessly with each other and with a user device, such as a smartphone, smartwatch, or similar device. The wireless audio devices may be used to output audio sent from the user device, such as music, as part of two-way communications, such as telephone calls, and/or to receive audio for speech recognition. A first audio device may communicate directly with the user device; a second audio device may communicate indirectly with the user device either via the first wireless device and/or by monitoring a wireless connection between the first audio device and the user device.

BRIEF DESCRIPTION OF DRAWINGS

For a more complete understanding of the present disclosure, reference is now made to the following description taken in conjunction with the accompanying drawings.

FIG. 1 illustrates a system configured to manage wireless connections according to embodiments of the present disclosure.

FIG. 2A illustrates components of a system configured to transmit data using wireless connections according to embodiments of the present disclosure.

FIGS. 3A and 3B illustrate components of wireless audio devices according to embodiments of the present disclosure.

FIGS. 4A-4C illustrate wireless audio devices according to embodiments of the present disclosure.

FIG. 5 illustrates a flow chart of determining when to handover primary earbud status according to embodiments of the present disclosure.

FIG. 7 illustrates example audio devices according to embodiments of the present disclosure.

FIG. 8 illustrates an example user device according to embodiments of the present disclosure.

FIG. 9 illustrates an example remote device according to embodiments of the present disclosure.

FIG. 10 illustrates an example of a computer network according to embodiments of the present disclosure.

DETAILED DESCRIPTION

Figure 2B:
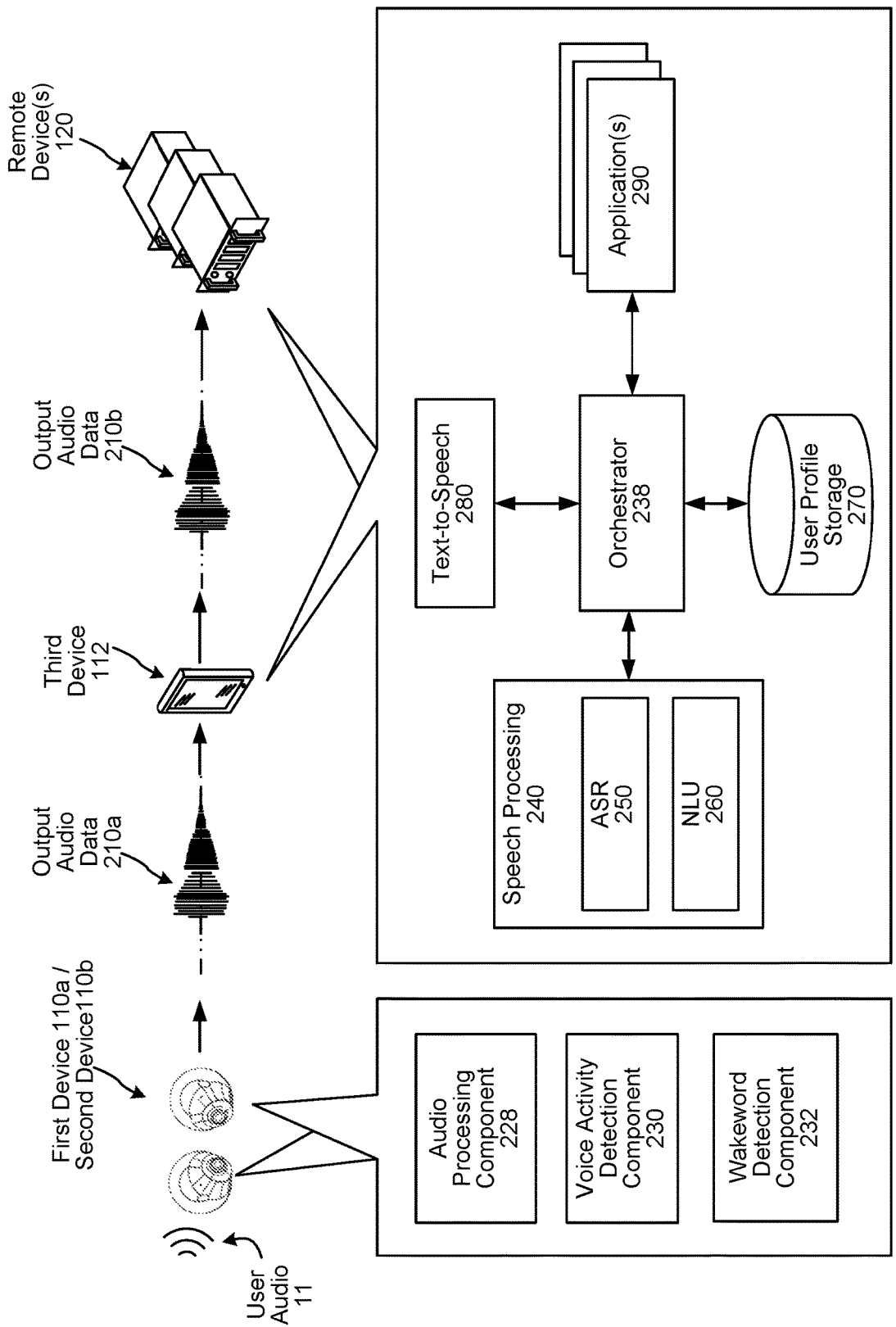
FIG. 2B illustrates components of a system configured to use a voice interface using wireless connections according to embodiments of the present disclosure.

Some electronic devices may include an audio-output component for outputting audio such as music and/or speech and an audio-input component for inputting audio such as speech of a user. A user may interact with such a device—which may be, for example, a smartphone, smart loudspeaker, tablet, computer, or other speech-controlled device—partially or exclusively using his or her voice and ears. Exemplary interactions include audio output such as listening to music or other audio, communications such as audio and/or video calls, audio messaging, and video messaging, and/or audio input for search queries, weather forecast requests, navigation requests, or other such interactions. The device may include one or more loudspeakers for outputting audio and/or one or more microphones for capturing voice input and hardware and/or software for converting the voice input into audio data. The device may further include hardware and/or software for analyzing the audio data and determining commands and requests therein and/or may send the audio data to a remote device for such analysis.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. In these situations, the user may prefer to connect headphones to the device. As the term is used herein, "headphones" may refer to any hands-free, wearable audio input/output device and includes headsets, earphones, earbuds, or any similar device. For added convenience, the user may choose wireless headphones, which communicate with the device—and optionally each other—via a wireless connection, such as Bluetooth (which may include Bluetooth Low Energy (BTLE)), Wi-Fi, near-field magnetic induction (NFMI), Long Term Evolution (LTE), or any other type of wireless connection.

In the present disclosure, for clarity, headphone components that are capable of communication with both a third device and each other are referred to as "wireless earbuds," but the term "earbud" does not limit the present disclosure to any particular type of wired or wireless headphones and may include any device capable of audio output and of being worn on or near a user's ear. The present disclosure may further differentiate between a "right earbud," meaning a headphone component configured to be disposed in or near a right ear of a user, and a "left earbud," meaning a headphone component configured to be disposed in or near a left ear of a user. In certain configurations the earbuds may be differentiated as either a "primary" earbud or a "secondary" earbud with the "primary" earbud managing communications with a third device (such as a smartphone, tablet, smart watch, or other device) and acting as an intermediary between the third device and the "secondary" device. Specifically, a "primary" earbud communicates with the "secondary" earbud, using a first wireless connection (such as a Bluetooth connection). The primary earbud further communicates with the third device using a second connection (such as a Bluetooth connection). The secondary earbud communicates directly with only with the primary earbud and does not communicate using a dedicated connection directly with the third device; communications between the secondary earbud and the third device may pass through the primary earbud via the first wireless connection and/or occur by the secondary earbud monitoring, or "snooping," communications between the primary earbud and the third device, though the third device may in certain instances communicate directly with the third device (such as to determine the signal strength between the secondary earbud and the third device) using what may be referred to as a third wireless connection.

Some or all of the data sent from the user device and received by the primary earbud may thus also be received by the secondary earbud. The secondary earbud may monitor the second connection between the third device and the primary earbud and receive any data sent to the primary earbud. The secondary earbud may not send any data to the third device during this monitoring. This monitoring of the second connection may be referred to as "snooping" or "sniffing" the second connection. As the term is used herein, "snooping" or "sniffing" refers to monitoring of a network connection between other devices, such as a wireless network connection between the other devices, to determine data and/or one or more attributes regarding the network, such as stack information, baseband information, or any other such information. The secondary earbud may maintain information about the second wireless connection between the primary earbud and the smartphone, such as stack layer information and baseband-connection information. This wireless connection information may be sent from the primary earbud, and/or the secondary earbud may determine it by "snooping" on the second wireless connection.

The primary and secondary earbuds may include similar hardware and software; in other instances, the secondary earbud contains only a subset of the hardware/software included in the primary earbud. In certain configurations, the primary and secondary earbuds may trade the roles of primary and secondary prior to or during operation via a process referred to herein as "handover." In the present disclosure, the primary earbud may be referred to as the "first device," the secondary earbud may be referred to as the "second device," and the smartphone or other user device may be referred to as the "third device." The first, second, and/or third devices may communicate over a network, such as the Internet, with one or more server devices, which may be referred to as "remote device(s)."

Wireless earbuds, which communicate wirelessly not only with a third device (such as a mobile device, tablet, etc.) but with each other, may be more desirable and/or convenient to users because the earbuds do not require a wire or cord connecting them; such a cord may be distracting and/or uncomfortable. The lack of a connecting cord means, however, that each earbud requires its own power source, such as a battery, and that the power source is necessarily limited. Because the primary earbud maintains two wireless connections (one with the secondary earbud and one with the third device), it may consume power more quickly than the secondary earbud and therefore exhaust its battery power more quickly. Cessation of communications may be inconvenient to the user, such as if music being output by the earbuds ceases, or may be more than inconvenient if, for example, the user was engaged in an important telephone call or relying on audio navigation directions.

The present disclosure is not, however, limited to only earbuds or other wearable wireless audio devices. In some embodiments, the wireless audio devices are two or more loudspeakers that communicate with a user device; the loudspeakers may, like the wearable audio devices, operate using battery power. The present disclosure is similarly not limited to only two wireless audio devices, and any number of wireless audio devices is within its scope. For example, a first set of wireless audio devices may include two loudspeakers, one of which is configured to output a right stereo channel and the other of which is configured to output a left stereo channel. One of the devices may be configured as the primary and the other may be configured as the secondary. In other embodiments, the set of wireless audio devices may include three loudspeakers; one configured to output a right stereo channel and as the primary (for example), and the other two configured to output a left and center stereo channel, respectively, and both configured to act as secondaries. In addition, while the present disclosure discusses the sending of audio data from the user device to the wireless audio devices, the sending of any data is within its scope. For example, the user device may send data corresponding to a firmware update to the wireless audio devices; the techniques described herein apply to the sending of any data.

In certain earbud configurations, the audio experience quality gauged based on the links between the phone and primary/secondary buds, e.g., the second wireless connection between the primary earbud and the third device and the third wireless connection between the secondary earbud and the third device. The earbud-to-earbud connection (e.g., the first wireless connection) may be considered relatively constant as it is typically always through the head. Thus the only evaluation of the first wireless connection (sometimes called the bud-to-bud or B2B connection) may be whether they are connected (a two-bud use case) or not (a one-earbud use case). Thus an earbud pair may rely on sensor(s) that detect whether an earbud is in an ear to determine if an earbud should be used, or if handover should occur or audio should be suspended, such as if an earbud falls out or otherwise leaves the communication range of the third device. While this may serve well in the primary use case of an earbud pair being used by a single individual who desires to receive audio to both ears, it may result in issues where the earbuds are being used in a different manner.

In certain cases both earbuds may be being used (and thus create a signal indicating that they are in an ear), but not by the same individual, for example when a user shares the earbud pair with another user so they both can listen to the same music at the same time through different earbuds of the same pair. A user typically does not know which earbud is the primary earbud that is managing communications with a third device and which earbud is the secondary earbud that relies on the primary to manage those communications. Thus, in certain situations, a secondary earbud may remain relatively close to a third device while a primary earbud moves away from the third device, such as when a first user wearing the primary earbud walks away from a second user wearing the secondary earbud, who remains near the third device. Other examples are also possible.

In normal situations where the primary earbud's connection to the third device becomes unstable it may trigger a handover to the secondary earbud, but in order to do so the connection between the primary and secondary earbuds (e.g., the B2B/first wireless connection) must itself be usable. In situations where the primary earbud moves away from the third device while the secondary earbud remains with the third device, not only does the wireless link between the primary earbud and the third device become unstable, but so does the wireless link between the primary earbud and secondary earbud, thus resulting in degradation of both wireless signals. Thus, by the time the primary earbud determines that a handover is appropriate due to the primary's failing link to the third device, handover may not be possible due to the primary earbud's failing link to the secondary earbud. This may result in the failure of the first earbud to perform a handover to the secondary earbud, which in turn may result in causing the entire audio connection between the third device and the earbud pair to fail and disconnect, resulting in dropped, stuttered, or otherwise interrupted audio and an undesirable user experience.

Offered is a system and method that solves this problem. The present disclosure thus offers a system and method for managing wireless connections of wireless audio devices to avoid unnecessarily disconnecting both earbuds as one of the earbuds moves away from an audio source. Specifically, the system will evaluate not only the signal quality of the B2B connection, but also its rate of change (which indicates rapid movement away from the third device), and if both satisfy certain conditions (e.g., falling below prescribed thresholds), the system will trigger a handover from the primary to the secondary earbud if the secondary earbud has a better connection to the third device. The signal quality may be measured based on an average of different measured signal quality values. A signal quality value is a value of a metric that may be used to determine the quality of a wireless communication connection (also referred to as a link) and/or an individual signal exchanged over the same. The rate of change may be calculated based on taking a slope of a line of best fit from those averaged values. Such measurements may be performed by both earbuds and if they fall below thresholds the system may check to see which earbud is closest to the third device (by evaluating their respective connections to the third device) and perform handover if the secondary earbud remains closest to the third device. Thus, even if the first earbud moves too far away from a third device to output audio, the connection between the third device will be handed over and maintained by the second earbud (which becomes the primary earbud) and audio will still be output over the second earbud. This also may allow the first earbud to resume audio playback once it again becomes in signal range of the second earbud and/or the third device.

FIG. 1 illustrates a system for sending and receiving wireless data including a first device 110a (e.g., a primary earbud) and a second device 110b (e.g., a secondary earbud). As shown, a first user 5 may be listening to audio 15a from a first earbud/device 110a while a second user 6 listens to audio 15b from a second earbud/device 110b. The first device 110a and the second device 110b communicate using a first wireless connection 114a, which may be a Bluetooth, NFMI, or similar connection. The first device 110a communicates with a third device 112, such as a smartphone, smart watch, or similar device, using a second connection 114b, which may also be a Bluetooth or similar connection. The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 114a between the first device 110a and the second device 110b is a low-power connection such as BLE; the second wireless connection 114b may include a high-bandwidth connection such as EDR in addition to or instead of a BLE connection. The third device 112 may communicate with one or more remote device(s) 120, which may be server devices, via a network 199, which may be the Internet, a wide- or local-area network, or any other network. The first device 110a may output first output audio 15a, and the second device 110b may output second output audio 15b. The first device 110a and second device 110b may capture user audio 11 from a user 5, process the user audio 11, and/or send data representing the user audio 11 and/or processed input audio to the third device 112 and/or remote device(s) 120, as described in greater detail below.

In various embodiments, as also explained in greater detail below, a first device 110a (e.g., a primary device) may move away from the second device 110b (or vice-versa). For example, the first user 5 may walk away from the third device 112 which may cause both the first connection 114a and the second connection 114b to deteriorate. To avoid the losing the connection between the primary earbud 110a and the third device 112, the first device 110a may begin by determining how far it is from a secondary device 110b. To do so, the first device 110a (e.g., a primary device) determines (130) data corresponding to a first signal quality value of the first wireless connection 114a between the first device 110a and the second device 110b (e.g., the B2B connection). As explained in greater detail below, the signal quality value may correspond to a particular metric such as received signal strength indicator (RSSI), packet error rate (PER), a function (for example an average) of the two, and/or other metrics such as signal-to-noise ratio (SNR), signal to interference plus noise ratio (SINR), channel quality index (CQI), or the like. The signal quality value may also correspond to an average of several different measured individual signal quality values determined over a period of time. The first device 110a may also determine (132) that the first signal quality satisfies a first condition (e.g., is less than a signal quality threshold value). If the first signal quality falls below a threshold value, the first device 110a may determine that it is beyond a certain distance from the second audio device 110b.

The first device 110a may determine (134) a rate of change of the signal quality of the first wireless connection 114a. As explained in greater detail below, this may involve processing a number of signal quality values for the first wireless connection 114a to determine how quickly they are changing, for example by calculating the slope of a best fit line of stored signal quality values. The first device 110a may then determine (136) that the rate of change satisfies a second condition (e.g., is less than a rate change threshold value). If the rate of change of signal quality falls below a threshold value, the first device 110a may determine that the first device and second device 110b are moving apart quickly, and a handover may be appropriate. To check to make sure handover is appropriate the first device 110a may compare a signal quality of its connection to the third device 112 over second connection 114b to a signal quality of the second device 110b to the third device 112 over third connection 114c. To perform this comparison the first device 110a may receive information about the signal quality of the third connection 114c from the second device 110b. The first device 110a may request this information from the second device 110b (for example, as a result of determining the first signal quality satisfying the first condition and/or the rate of change satisfying the second condition). The second device 110b may affirmatively send this information to the first device 110a (for example as a result of the second device performing a similar process to steps 130-136). The first device 110a may determine (138) that the signal quality of the second connection 114b is of lower quality than the signal quality of the third connection 114c. The first device 110a may then cause (140) handover of wireless communication management from the first device 110a to the second device 110b, thus causing the second device 110b to become the primary device and the first device 110a to become the secondary device. If the first device 110a determines that the signal quality of the second connection 114b is of higher quality than the signal quality of the third connection 114c, it may determine not to request the handover as its connection to the third device 112 is better than that of the second device 110b (e.g., the second connection 114b is better than the third connection 114c).

The system of FIG. 1 may operate using various connection components as described in FIGS. 2A and 2B. The various components may be located on the same or on different physical devices. Communication between various components may occur directly or across a network(s) 199. Below is a discussion of those components.

The devices 110a/110b may each include a handover controller 224, and/or a signal-quality component 226. The handover controller 224 may determine if and when to perform a handover (e.g., exchange roles of primary and secondary for the devices 110a/110b). A signal quality component 226 may determine a signal quality of the wireless signal output by the third device 112 and received by the first device 110*a* and/or second device 110*b*. Each of these components is described in greater detail below.

The remote device(s) 120 and/or third device 112 may include a variety of other components (such as those illustrated in FIG. 2B) configured to perform various operations, such as speech processing operations. Although described below in reference to remote device(s) 120, such components may also be located on third device 112. The remote device(s) 120 may include an orchestrator component 238. The orchestrator component 238 may include memory and logic that enables it to transmit and receive various pieces and forms of data to various components of the system. The remote device(s) 120 may include user profile storage 270 that may include, for example, information related to the devices 110*a*/110*b*, such as network identification or password information, and may include one or more application(s) 290. The application(s) 290 may include, for example, an audio-output application such as a music player, and a voice-communication component, such as a voice-over-IP ("VOIP") application. Each of these applications may cause the devices 110*a*/110*b* to output audio. The applications 290 may further include speech-processing applications, as described in greater detail below with reference to FIG. 2B. The user profile 270 may include or include an indication of data associated with the one or more applications, such as a music library or list of contacts.

As described above, the system of FIG. 1 may operate using various speech-processing and other components as described in FIG. 2B, in addition to outputting audio as described herein. The various components may be located on the same or on different physical devices. Communication between various components may occur directly or across a network(s) 199. Below is a discussion of those components, followed by a further discussion of capturing audio.

The devices 110*a*/110*b* may monitor ambient audio to determine whether speech is present in the audio using, for example, voice-activity detection (VAD). Once a device detects speech in the audio, it may detect if a wakeword is represented in the audio. This wakeword-detection process may also be referred to as keyword detection, with the wakeword being a specific example of a keyword. To determine whether a wakeword is spoken, the device may compare captured audio data to a stored wakeword signature. The wakeword signature may correspond to a built-in word or phrase or may be programmed by the user. When the device detects a wakeword, the device may "wake" and send captured audio data to another device, such as third device 112 and/or a remote system 120 for speech processing and a determination of output content responsive to the received audio.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus, a spoken-language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech-processing system may be configured as a relatively self-contained system in which a single device captures audio, performs speech processing, and executes a command corresponding to the input speech. Alternatively, a speech processing system may be configured as a distributed system in which a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive; significant computing resources may be needed to perform ASR and NLU processing within a reasonable time frame. Because of this expense, a distributed computing environment may be used when performing speech processing. A typical such distributed environment may involve one or more local devices having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more servers may combine to perform ASR, one or more servers may combine to perform NLU, and so on. The command may then be executed by one or a combination of remote and local devices depending on the command itself.

The devices 110*a*/110*b* may each include an audio-processing component 228, a voice-activity detection component 230, a wakeword-detection component 232, and/or other components. The devices 110*a*/110*b* may receive input audio 11 using an audio capture component, such as a microphone or microphone array, as explained in more detail with reference to FIGS. 3A and 3B. The audio-processing component 228 may receive the captured audio and determine audio data based thereon. In some embodiments, the audio-processing component 228 includes a hardware and/or software analog-to-digital converter that converts the analog input audio, as captured by the microphone, into a digital audio signal for inclusion in the audio data. The analog-to-digital converter may sample the input audio 11 at any of a variety of different sample rates and amplifications. The audio-processing component 228 may further include noise reduction, automatic gain control, or any other such audio processing hardware or software. The audio-processing component 228 may include an encryption and/or compression component to encrypt and/or compress the audio data; the encryption and/or compression may conform to an industry standard, such as Bluetooth.

The voice-activity detection component 230 may monitor the input audio 11 to determine whether speech is present. For example, the voice-activity detection component 230 may analyze various quantitative aspects of the audio data, such as, for example, the spectral slope between one or more frames of the audio, the energy levels of the audio in one or more spectral bands, the signal-to-noise ratios of the audio in one or more spectral bands, and/or other quantitative aspects. In some instances, the voice-activity detection component 230 may use a trained classifier configured to distinguish speech from background noise. The classifier may be implemented using linear classifiers, support vector machines, and/or decision trees. The voice-activity detection component 230 may apply techniques using, for example, a Hidden Markov Model (HMM) or a Gaussian Mixture Model (GMM) to compare the audio data to one or more acoustic models in speech storage; the acoustic models may include models corresponding to speech, noise (e.g., environmental noise or background noise), and/or silence. The voice-activity detection component 230 may "trigger" when it determines that speech is present in the audio and may transmit notification of the trigger to, for example, the audio-processing component 228, the wakeword-detection component 232, another device 110a/110b, and/or the third device 112.

The wakeword-detection component 232 may process input the audio data—continuously, at intervals, and/or in response to a notification of the triggering of the VAD component—to determine if a keyword (e.g., a wakeword) is present in the audio data. In some embodiments, however, such as telephone calls or other such communications, no wakeword is needed or expected. Following detection of a wakeword, the devices 110a/110b may output audio data 210a, which may include at least a portion of the audio data, to the third device 112, which may in turn send corresponding output audio data 210b to the remote device(s) 120. The output audio data 210a may at least partially correspond to input audio 11 captured subsequent to input audio corresponding to the wakeword. That is, the input audio data may correspond to a spoken command that follows a spoken wakeword and optionally includes the spoken wakeword.

The wakeword-detection component 232 may compare audio data to stored models or data to detect a wakeword. One approach for wakeword detection applies general large-vocabulary continuous speech-recognition (LVCSR) systems to decode the audio signals, with wakeword searching conducted in the resulting lattices or confusion networks. LVCSR decoding may, however, require relatively high computational resources. Another approach for wakeword detection builds HMMs for each wakeword and non-wakeword speech signals respectively. The non-wakeword speech includes other spoken words, background noise, etc. There may be one or more HMMs built to model the non-wakeword speech characteristics, which are named filler models. Viterbi decoding may be used to search the best path in the decoding graph, and the decoding output may be further processed to make the decision on keyword presence. This approach may be extended to include discriminative information by incorporating a hybrid DNN-HMM decoding framework. In another example, the wakeword-detection component 232 may be built on deep neural network (DNN)/recursive neural network (RNN) structures without using a HMM. Such a wakeword-detection component 232 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the remote device(s) 120, the output audio data 210b or other data may be sent to the orchestrator component 238. The orchestrator component 238 may include memory and logic that enables it to transmit and receive various pieces and forms of data to various components of the system. The orchestrator component 238 may send the output audio data 210b to a speech-processing component 240. An ASR component 250 of the speech processing component 240 may transcribe the output audio data 210b into text data representing one more hypotheses representing a spoken command represented in the output audio data 210b. The ASR component 250 may interpret the spoken command represented in the output audio data 210b based on a similarity between the spoken command and pre-established language models. For example, the ASR component 250 may compare the output audio data 210b with models for sounds (e.g., subword units, such as phonemes, senons, etc.) and sequences of sounds to identify words that match the sequence of sounds corresponding to the spoken command represented in the output audio data 210b. The ASR component 250 may send the text data generated thereby to an NLU component 260 of the speech processing component 240. The text data sent from the ASR component 250 to the NLU component 260 may include a top-scoring hypothesis or may include an N-best list including multiple hypotheses. An N-best list may additionally include a score associated with each hypothesis represented therein. Each score may indicate a confidence of ASR processing performed with respect to the hypothesis with which it is associated. While FIG. 2A illustrates components of the remote device(s) 120 communicating via the orchestrator component 238, one skilled in the art will appreciated that various components of the remote device(s) 120 may communication directly.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 may determine an intent of the command represented in the text data (e.g., an action that a user desires be performed) and/or pertinent pieces of information in the text data that allow a device (e.g., the devices 110a/110b, the remote device(s) 120, etc.) to execute the intent. For example, if the text data corresponds to "call mom," the NLU component 260 may determine that the user intended to activate a telephone application on his/her device and to initiate a call with a contact matching the entity "mom."

The remote device(s) 120 may also include various applications 290. It should be appreciated that the remote device(s) 120 may additionally or alternatively communicate with one or more application servers executing third-party applications. The applications 290 may include, for example, shopping applications, mapping applications, weather applications, taxi or car-sharing applications, or the like. In some embodiments, the applications 290 include communications applications such as telephone applications, voice-over-IP applications, or similar applications; if these applications are used, the orchestrator component may send the output audio data 210a there and not to the speech-processing component 240.

The remote device(s) 120 may include a TTS component 280 that generates audio data from text data using one or more different methods. In one method of synthesis called unit selection, the TTS component 280 matches text data against a database of recorded speech. The TTS component 280 may select matching units of recorded speech matching the text data and concatenates the units together to form audio data. In another method of synthesis, called parametric synthesis, the TTS component 280 varies parameters such as frequency, volume, and noise to create audio data including an artificial speech waveform. Parametric synthesis uses a computerized voice generator, sometimes called a vocoder.

FIGS. 3A and 3B illustrate features of embodiments of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless earbuds having an inner-lobe insert; as mentioned above, however, the present disclosure is not limited to only wireless earbuds, and any wearable audio input/output system, such as a headset, over-the-ear headphones, as well as other systems such as wireless loudspeakers, is within the scope of the present disclosure.

The devices 110a/110b may include a loudspeaker 302a/302b, one or more first microphone(s) 304a/304b, and/or one or more second microphones 305a/305b. The loudspeaker 302a/302b may be any type of loudspeaker, such as an electrodynamic loudspeaker, electrostatic loudspeaker, diaphragm loudspeaker, or piezoelectric loudspeaker; the microphones 304a/304b/305a/305b may be any type of microphones, such as piezoelectric or MEMS microphones. Each device 110a/110b may include one or more microphones 304a/304b/305a/305b. Each device 110a/110b may further include an infrared (IR) sensor 307a/307b that may sense a proximity to an object, such as a portion of a body of a user (such as the user's ear).

The loudspeaker 302a/302b and microphones 304a/304b/305a/305b may be mounted on, disposed on, or otherwise connected to the device 110a/110b. The devices 110a/110b further include an inner-lobe insert that may bring the loudspeaker 302a/302b and/or first microphone(s) 304a/304b closer to the eardrum of the user and/or block ambient noise.

Figure 4A:
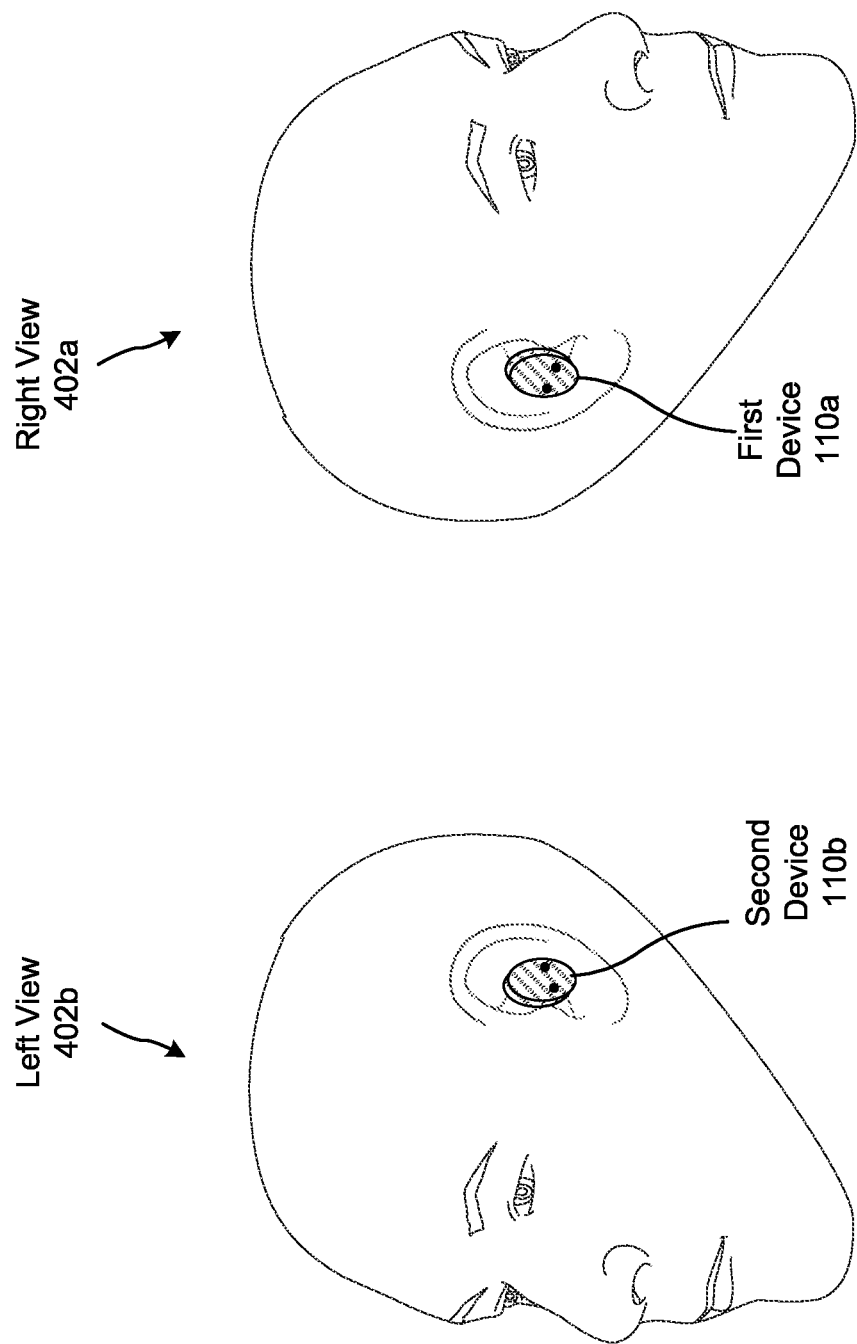

One or more batteries 306a/306b may be used to supply power to the devices 110a/110b. One or more antennas 310a/310b may be used to transmit and/or receive wireless signals over the first connection 114a and/or second connection 114b; an I/O interface may contain software and hardware to control the antennas 310a/310b and transmit signals to and from other components. A processor 314a/314b may be used to execute instructions in a memory 316a/316b; the memory 316a/316b may include volatile memory (e.g., random-access memory) and/or non-volatile memory or storage (e.g., flash memory). One or more other sensors, such as accelerometers, gyroscopes, or any other such sensor may be used to sense physical properties related to the devices 110a/110b, such as orientation; this orientation may be used to determine whether either or both of the devices 110a/110b are currently disposed in an ear of the user (i.e., an "in-ear" status of each device). The instructions may correspond to the handover controller 224, audio-processing component 228, voice-activity detection component 230, wakeword-detection component 232, and/or other components discussed above. FIG. 4A illustrates a right view 402a and a left view 402b of a user of the first device 110a and the second device 110b having the devices 110a/110b disposed in-ear.

The primary earbud may receive one or more packets or other data that is not received by the secondary earbud; in other instances, the secondary earbud may receive one or more packets or other data that is not received by the primary earbud. The primary and/or secondary earbuds may thus determine a time during which the third device has temporarily stopped sending data. During this time, the primary and secondary earbuds exchange communications to determine if the primary and/or secondary earbud(s) have not received one or more packets; for example, the primary earbud and/or secondary earbud may send the primary earbud and/or secondary earbud data identifying each received packet, a last received packet, a number of received packets, or similar information. The primary and/or secondary earbuds may use this data to determine data identifying the one or more unreceived packets and send this data to the other earbud, which in turn transmits the corresponding packets to the earbud lacking the packets. This bidirectional sending of packets either from the primary earbud to the secondary earbud and/or from the secondary earbud to the primary earbud may ensure that if at least one earbud receives a packet—either the primary or the secondary—the third device need not re-send the packet, and the two earbuds coordinate to send the missed packet in either direction between them.

In various embodiments, the signal-quality component 226 determines signal quality data corresponding to signal quality values for the first device 110a and/or second device 110b. The signal quality value may represent a quantification of an ability of the first device 110a and/or second device 110b to accurately receive data from the other respective device 110a/110b or from the third device 112. As mentioned herein, the first device 110a may receive data from the second device 110b (or vice versa) via the first connection 114a which may be a connection established between the first device 110a and the second device 110b to send and receive data; a first signal-quality value determined by the first device 110a may therefore represent the ability of the first device 110a to receive data via this first connection 114a. Alternatively, a first signal-quality value determined by the second device 110b may therefore represent the ability of the second device 110b to receive data via this first connection. The first device 110a may receive data from the third device 112 via the second connection 114b, which may be a connection established between the first device 110a and the third device 112 to send and receive data; a second signal-quality value determined by the first device 110a may therefore represent the ability of the first device 110a to receive data via this second connection 114b. The second device 110b may receive data from the third device 112 via the third connection 114c; this connection, as described herein, may be a passive "sniffing" or "snooping" connection that permits the second device 110b to receive data from the third device 112 but does not permit the second device 110b to directly send data to the third device. A third signal quality value determined by the second device 110b may therefore represent the ability of the second device 110b to receive data via the third connection 114b.

The first, second, and/or third signal quality value may include a single measurement or a combination of more than one measurement. One measurement of signal quality corresponds to a strength of the wireless signal output by the third device 112 (corresponding to the second connection 114b) as received by the first device 110a and/or second device 110b. Examples of this measurement of signal quality include a received signal strength indicator (RSSI) and received channel power indicator (RCPI). Other examples include instantaneous or average received power and instantaneous or average received amplitude of the wireless signal. The value of this signal quality value may range from 0 (no signal) to 100 (maximum signal); any range of values is, however, within the scope of the present invention. The range of values may be determined by causing the third device 112 to cease output of the wireless signal (to determine the zero value) and causing the third device 112 to output the wireless signal while proximate the first device 110a and/or second device 110b (to determine the 100 value).

Another signal quality value may be an indication of an amount of data sent by one device compared to the amount of that data received by the recipient device. An example of such an indication is the packet error rate (PER), which represents a number of packets of data sent by the sending device (e.g., the third device 112) compared to a number of packets received by the recipient device (e.g., the first device 110a and/or second device 110b). The recipient device may determine whether one or more packets are received or not received by examining information contained in the packets, such as a packet number, and determining that one or more numbers corresponding to one or more packets were not received. Another example of such an indication is a bit error rate. For example, the third device 112 may send one or more error bits, such as parity bits or error-correction code (ECC) bits, along with any data sent to the first device 110a and/or second device 110b. The first and/or second device 110b/110b may determine the bit error rate by determining which sets of bits of data do not match their corresponding error bits. The packet- and/or bit-error rate (referred to herein as an indication of data received) may similarly be normalized on a scale, such as a scale of 0 to 100, wherein 0 indicates no data received and 100 indicates all data received.

In various embodiments, the signal-strength indication (e.g., RSSI) may be orthogonal to the data-received indication (e.g., PER). That is, a wireless signal having a low RSSI may have a low PER, while a wireless signal having a high RSSI may have a high PER. In some embodiments, therefore, the signal-quality component 226 may combine the signal-strength indication and the data-received indication to determine an overall signal-quality value. In some embodiments, as described above, each of the signal-strength indication and the data-received indication may be normalized to the same scale, such as 0-100. In these embodiments, the signal-quality component 226 may average each indication to determine the signal-quality value. In other embodiments, the signal-quality component 226 may apply a weight factor to either or both of the signal-strength indication and the data-received indication to determine the signal-quality value. If, for example, one of the signal-strength indication and the data-received indication is determined experimentally to be a more accurate representation of the overall signal quality, the signal-quality component 226 may apply a greater weight factor to that one of the signal-strength indication and the data-received indication. The weight factor(s) may further be determined or adjusted by the signal-quality component 226 dynamically; if, for example, fluctuation of a first indication is observed but fluctuation of a second indication is not, while when fluctuation of the second indication occurs, fluctuation of the first indication also occurs, the signal-quality component 226 may determine that the second indication better represents the overall signal quality and weight the second indication with a greater weight.

The signal-quality component 226 may determine signal quality data that represents the signal-quality values. The signal-quality component 226 of the first device 110a may determine first signal quality data; the signal-quality value of the second device 110b may determine second signal quality data and cause sending, to the first device 110a, the second signal quality data. The signal-quality component 226 may thus determine, directly or indirectly, the first signal-quality data and the second signal quality data. The second device 110b may send, to the first device 110a, the second signal-quality data periodically, such as once per second; the first device 110a may similarly determine the first signal-quality data once per second. In some embodiments, the first device 110a may send, to the second device 110b, one or more requests for the second signal-quality data. In some embodiments, the frequency of determination of the signal-quality data may change; if, for example, the signal quality is changing quickly, the frequency may increase, and if the signal quality is changing slowly, the frequency may decrease.

To determine whether to the trigger a handover, the handover controller 224 of the first device 110a may use signal quality information from the second device 110b, for example information regarding the third connection 114c. Accordingly, the second device 110b may further send, to the first device 110a, wireless connection information regarding the third connection 114c (e.g., RSSI, PER, or other signal quality values related to the third connection 114c) in addition to other wireless connection information. Such other wireless connection information may include, for example, stack layer information and baseband-connection information. Specifically, the wireless connection information may include the address of the first device 110a and/or third device 112, which may be a Bluetooth device address (BDA), and one or more security credentials associated with the third device 112, which may include a link key, a BLE long-term key, a BLE identity-resolution key, or any other such credential. The wireless connection information may further include a service discovery protocol (SDP) record and/or logical-link control and adaptation protocol (L2CAP) channel information, such as channel identification (CID) information, protocol and service multiplexer (PSM) information, maximum transmission unit (MTU) information, or any other such channel information. The wireless connection information may further include radio-frequency communication (RFCOMM) link information, such as service channel number (SCN), credits, flow method, or other such link information. The wireless connection information may include profile information, such as hands-free status, advanced audio distribution profile (A2DP) information, audio/video remote-control profile (AVRCP) information, serial-port profile (SPP) information, or other such profile information. The wireless connection information may also include application-specific information, such as the application context of the first device 110a and/or second device 110b, sensor-related information such as orientation information, and/or configuration information for, for example, digital-signal processing (DSP).

The handover controller 224 may receive the signal quality data and determine whether to maintain a current state (e.g., a current primary/secondary status and/or a current amplifier status) or to potentially change the current state. If, for example, neither the first nor the second signal quality values have changed from one or more previous values (or changed less than a threshold, such as 5%), the handover controller 224 may cease further processing, and the signal-quality component 226 may resume determination of additional signal-quality data.

If, however, the handover controller 224 determines that one or both of the signal quality values has changed from a previous value or changed more than a threshold than a previous value, or satisfies (or fails to satisfy) a condition (such as meeting or failing to meet a threshold) the handover controller 224 may determine whether to request a handover. As explained in greater detail below with respect to FIG. 5, determination of the handover request may depend on at least the first and second signal quality values, the rate of change of signal quality of the B2B connection, and other factors.

If the handover controller 224 determines to request a handover, a handover manager (not shown) may determine whether a handover is possible. The handover manager may, for example, determine an amount of power available to the second device 110b (e.g., a power level of a battery of the second device 110b). If the amount of power available is less than a power threshold (e.g., 5% or 10%), the handover manager may deny the request for the handover. The handover manager may further determine that the second device 110b is not proximate the first device 110a and/or third device 112 and/or is not proximate the ear of the user; if so, the handover manager may similarly deny the request for the handover.

In some embodiments, the signal-quality component 226 may determine average values for both the signal quality value of the first device 110a and the signal quality value of the second device 110b. The signal-quality component 226 may, for example, determine a number of values for the signal quality values over a period of time and determine the averages by averaging those periodic values. In some embodiments, the period of time is five seconds; if, as described above, the signal-quality component 226 determines new values for the signal quality values each second, the average values correspond to the average of five values. In some embodiments, the average is a running average in which a newest value determined for each signal quality value is included in computation of the average and an oldest value determined for each signal quality value is removed from computation of the average. In some embodiments the period of time is 300 ms, though this is adjustable depending on how fast/slow signal quality may be changing. Further, the signal quality values may be stored in a circular buffer or other first-in-first-out (FIFO) storage which replaces old values with new values as the new values are available. Under such a FIFO arrangement, only a certain number of signal quality values are stored at a time. That number is configurable, but as noted below may be four values.

In some embodiments, after a first handover is performed, the handover controller 224 prevents occurrence of a second handover for a period of time. In some embodiments, this period of time is three seconds. For example, the handover controller 224 may determine that a wireless connection 114b between the first device 110a and the user device 112 occurred during a first period of time and that another wireless connection 114c corresponding to the handover occurs during a second period of time later than the first period of time. The handover controller 224 may thus determine that a difference between the first and second periods of time is greater than a threshold (e.g., three seconds) before allowing the handover to prevent rapid switching of the primary status between the first device 110a and the second device 110b.

Figure 4C:
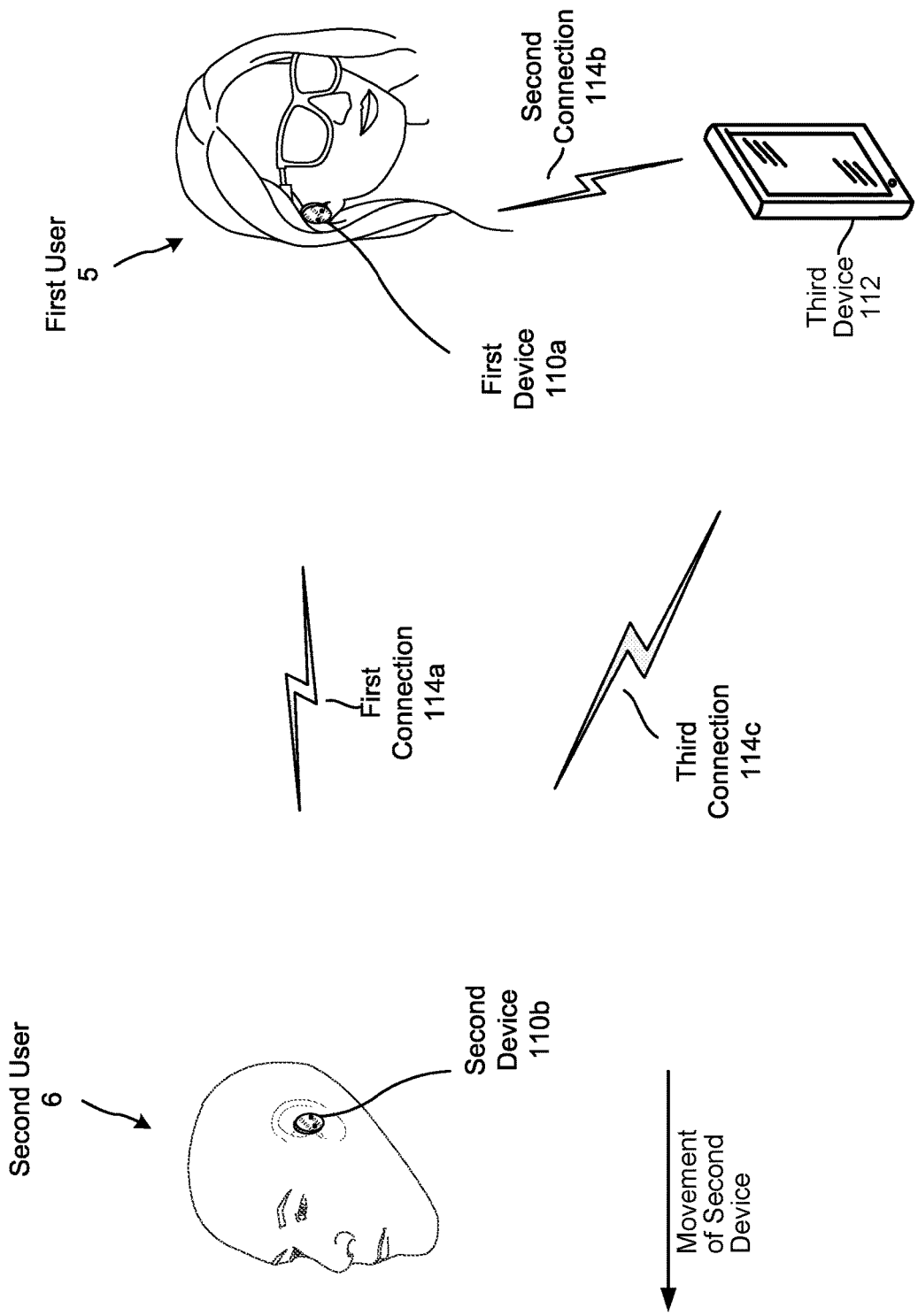

As described above, in certain situations a pair of earbuds may be shared by two different users, for example as illustrated in FIGS. 4B and 4C. As shown, a first user 5 may be wearing a first earbud 110a while a second user 6 wears a second earbud 110b. As shown in FIG. 4B, the first user 5 may walk away from the third device 112 which may cause both the first connection 114a and the second connection 114b to deteriorate. A similar situation may occur in FIG. 4C where the second user 6 walks away from the third device 112. While the first earbud 110a moves away from the third device 112, the first earbud 110a may generate an "in ear" signal which indicates that the first earbud 110a should not be disconnected from the third device 112. The second earbud 110b may similarly generate an "in ear" signal which indicates that the second earbud 110b should not be disconnected from the third device 112. However the farther the first device 110a (or second device 110b) moves from the third device 112, the greater the likelihood the second connection 114b between the first device 110a and third device 112 may fail. To avoid this failure, the system may perform the operations shown in FIG. 5.

FIG. 5 illustrates methods for managing wireless connections according to embodiments of the present disclosure. As described herein, said management may include causing handover of primary status from a first wireless audio device 110a to a second wireless audio device 110b. As noted in FIG. 5, the system may operate (502) wireless connections. This may include normal wireless communication operations such as communicating over a first wireless connection 114a between the first device 110a of an earbud pair and the second device 110b of the earbud pair. This may also include communicating over a second wireless connection 114b between the first device 110a and a third device 112, such as a mobile phone, tablet, or other device.

The first device 110a may then determine (504a) a signal quality value for the first connection 114a (e.g., B2B link) and may update a buffer or other storage (e.g., storage 708) that stores signal quality values. This signal quality value may be determined by the signal quality component 226 or other component. Various data metrics may be used as the signal quality value. The signal quality value may be an RSSI, a PER, combination thereof, or other metric such as SNR, SINR, CQI, or the like. The signal quality value may also be an average of other values, thus taking into account various audio signal information, depending on system configuration. For example, in one embodiment an earbud may periodically calculate an audio quality score (AQS), which represents a weighted average of RSSI and PER. An AQS value one example of a signal quality metric. A single AQS value may be an example of a signal quality value, as may be an average of multiple AQS values. When calculated for the first connection 114a, such an AQS provides information on the signal quality between the buds. The AQS may thus be represented as f (RSSI, PER) where the precise weighting/combination function is configurable. Individual AQS values may be determined for the first connection 114a periodically, for example every 300 ms or at some other rate. The rate may be configured depending on how fast/slow the B2B link quality is changing.

As noted, the first device 110a may update a buffer to store a most recent signal quality value (e.g., AQS). The first device 110a may use a FIFO array, circular buffer, or the like to store recent values and discard older ones. The storage may be configured to store a certain number of values n, which is configurable. For ease of computations described below, n may be set to 4, but other numbers of values may also be used. Values in the buffer may be retrieved when operations are to be performed using the values stored in the buffer.

The first device 110a may determine (506a) an average signal quality using the stored values. This average quality value may be determined by the signal quality component 226 or other component. For example, the first device 110a may determine a mean value by summing all the signal quality values stored in the buffer and dividing by the number of values n. As illustrated in FIG. 5, steps 504a and 506a are examples of step 130 described above in reference to FIG. 1, however other metrics and signal quality values may be used for the evaluation of the first wireless connection 114a depending on system configuration.

As noted in FIG. 1, the first device 110a may then determine (132) that the first signal quality value satisfies a condition. This may include processing data corresponding to the average value (or other signal quality value) with respect to data corresponding to a condition. For example, referring again to FIG. 5, the first device 110a may determine whether the average signal quality value (e.g., average AQS) is above a threshold value as shown in step 508*a*. This may be performed by the signal quality component 226, handover controller 224, or other component. If the average signal quality value is above a threshold value (508*a*:Y), the first device 110*a* may continue to operate as normal and return to the step of gathering signal quality values (e.g., periodic measurement of one or more wireless communication links).

If the average signal quality value is not above a threshold value (508*a*:N), the first device 110*a* may, as noted in FIG. 1, determine (134) a rate of change of signal quality of the first wireless connection 114*a*. The rate of change may be determined by evaluating a plurality of determined signal quality values, for example the values stored in the buffer. The signal quality value (e.g., AQS) is expected to change linearly with the change in relative position of the first device 110*a* to the second device 110*b*, either increasing or decreasing. Thus, as noted in FIG. 5, the system may calculate (510*a*) a slope of a line of best fit of the buffered audio quality samples. Though other line fitting or other rate determination operations may be used. Such operations may be performed by the signal quality component 226, handover controller 224, or other component.

Figure 6A:
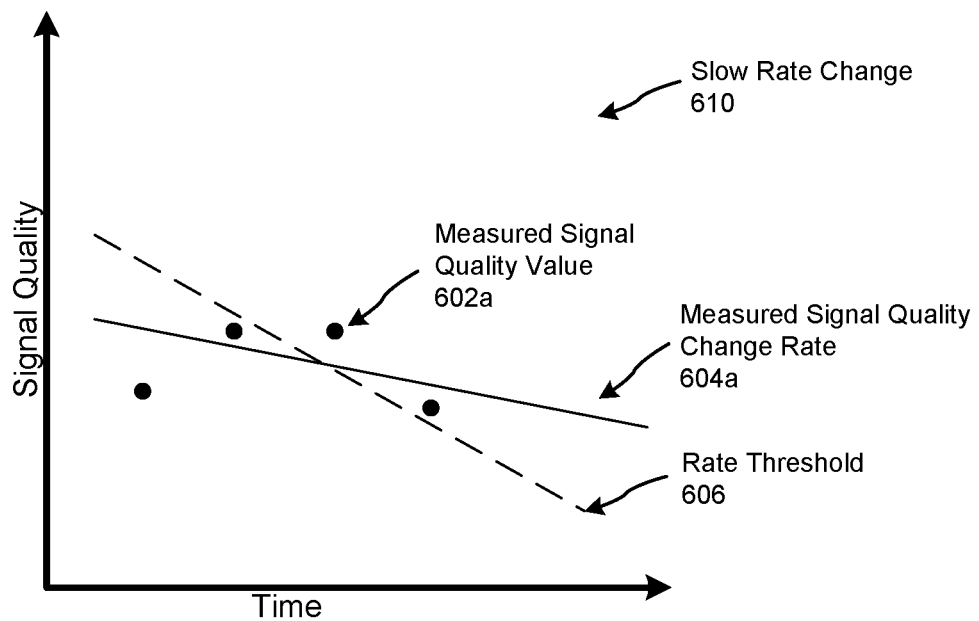
FIGS. 6A and 6B illustrated determining a signal quality change rate with respect to a rate threshold according to embodiments of the present disclosure.
Figure 6B:
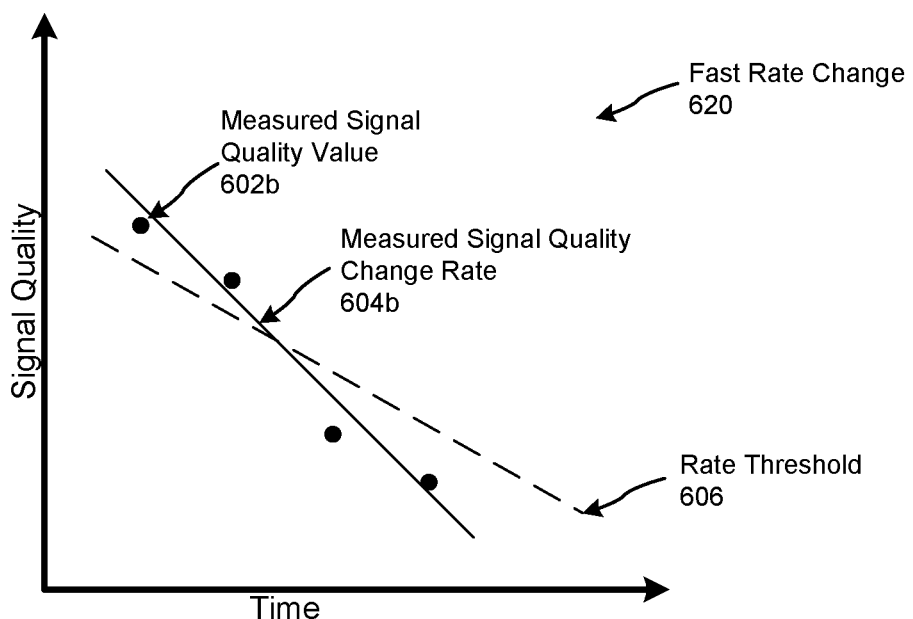

As shown in FIGS. 6A and 6B, individual measured signal quality values (e.g., 602*a*) may be plotted according to each value's signal quality (on the Y axis) and time (on the X axis). As shown in FIG. 6A, the four calculated points may result in a line of best fit (representing the change rate of the measured signal quality) of 604*a*.

To determine a slope m of the line of best fit the first device 110*a* may perform the following calculations:

$$\bar{X} = \frac{\sum_{i=1}^{n}(x_i)}{n} \quad \text{(Equation 1)}$$

$$\bar{Y} = \frac{\sum_{i=1}^{n}(y_i)}{n} \quad \text{(Equation 2)}$$

$$m = \frac{\sum_{i=1}^{n}(x_i - \bar{X})(y_i - \bar{Y})}{\sum_{i=1}^{n}(x_i - \bar{X})^2} \quad \text{(Equation 3)}$$

where n is the number of samples used, $x_i$ is the number of the sample (e.g., $x_i$=[1, 2, ..., n]) and ($x_i$, $y_i$) are the x-axis (e.g., sample number) and y-axis (e.g., signal quality) values of the $i^{th}$ sample point (e.g., AQS).

In certain configurations the value of n (number of samples) and $x_i$ (sample count) may be fixed. For example, where n=4 equally spaced sample values, the complex Equations 1-3 may be simplified, resulting in the overall Equation 3 simplifying (as shown in Equation 6) into a weighted sum of two differences, one between the $y_4$ and $y_1$ and other one is the $y_3$ and $y_2$. Thus the Equations 1-3 simplify as follows:

$$\bar{X} = \frac{10}{4} = 2.5 \quad \text{(Equation 4)}$$

$$\bar{Y} = \frac{\sum_{i=1}^{n}(y_i)}{4} \quad \text{(Equation 5)}$$

$$m = \frac{\sum_{i=1}^{n}(x_i - 2.5)(y_i - \bar{Y})}{\sum_{i=1}^{n}(x_i - 2.5)^2} = \frac{1.5(y_4 - y_1) + 0.5(y_3 - y_2)}{6.75} \quad \text{(Equation 6)}$$

Equations 4-6 may be more easily calculated using the signal quality component 226, handover controller 224, or other component of the first device 110*a*, which may be limited by the capabilities of processor 314. Such a simplification in the equations this will save computation time and power consumption for calculating these values periodically and evaluating them. The line of best fit/slope may be recalculated each time a new signal quality value is determined/the buffer is updated, thus allowing the described determinations to happen regularly and quickly.

Thus, with the slope m of the line of best fit determined, the first device 110*a* may use the slope m to compare (512*a*) to a rate threshold value. For example, as shown in FIG. 6A, a slow rate change 610 may be determined when the slope of the measured signal quality change rate line 604*a* (as determined using the measured signal quality values 602*a*) is greater than that of the rate threshold value 606. However as shown in FIG. 6B, a fast rate change 620 may be determined when the slope of the measured signal quality change rate line 604*b* (as determined using the measured signal quality values 602*b*) is less than that of the rate threshold value 606.

Thus, in one example, the first device 110*a* may determine (136) that the rate of change of signal quality satisfies a second condition by determining (512*a*) whether the slope of the line of best fit of the signal quality values is greater than a rate threshold value. Other techniques for determining (136) that the rate of change of signal quality satisfies a second condition may also be used. If the slope is greater than the rate threshold value (512:Y), the first device 110*a* may continue to operate as normal and return to the step of gathering signal quality values (e.g., periodic measurement of one or more wireless communication links).

If the slope is not greater than the rate threshold value (512:N), the first device 110*a* may determine (138) that the signal quality of the second connection 114*b* is lower than the signal quality of the third connection 114*c*. This may be done, for example as shown in FIG. 5, by comparing the signal quality of the second connection 114*b* to the signal quality of the third connection 114*c*. This may be performed by the signal quality component 226, handover controller 224, or other component. The signal quality of the second connection 114*b* may be determined by the first device 110*a*, for example by calculating an RSSI, PER, AQS, or other signal quality metric. The signal quality of the third connection 114*c* may be received by the first device 110*a* from the second device 110*b*. If the signal quality of the second connection 114*b* is better than the signal quality of the third connection 114*c* (e.g., the second signal quality value for the second connection 114*b* is higher than the third signal quality value for the third connection 114*c*), than the first device 110*a* likely has a better connection than the second device 110*b* and thus handover is likely not appropriate. If, however, the signal quality of the second connection 114*b* is worse than the signal quality of the third connection 114*c* (e.g., the second signal quality value for the second connection 114*b* is lower than the third signal quality value for the third connection 114*c*), than the second device 110*b* likely has a better connection than the first device 110*a* and thus handover is likely appropriate. Thus, if the quality of the second connection is better than the quality of the third connection (518:Y), the first device 110*a* may continue to operate as normal and return to the step of gathering signal quality values (e.g., periodic measurement of one or more wireless communication links). If, however, if the quality of the second connection is not better than the quality of the third connection (518:N), the first device 110*a* may trigger a handover (520), for example using the handover controller 224 or other component.

As can be seen in FIG. 5, the left hand side of the figure (e.g., steps 504*a*-512*a*) illustrates operations performed by the primary earbud (e.g., first device 110*a*) in evaluating the first connection 114*a*. Similar operations (e.g., 504*b*-512*b*) may be performed by the secondary earbud (e.g., second device 110*b*) which will result in an evaluation of the first connection 114*a* from the perspective of the second device 110*b*. Steps 504*b*-512*b* may be performed similarly to steps 504*a*-512*a* or may involve different operations depending on system configuration. If, as part of its evaluation, the second device 110*b* determines that the rate of change satisfies a condition (e.g., 136) such as the slope of the line of best fit is greater than the rate threshold value (512*b*:Y), because the second device 110*b* may not have the ability to trigger handover on its own, it may send (518) priority message including status information (e.g., signal quality value data corresponding to its measurements of the first connection 114*a*, third connection 114*c*, and/or other information) along with a request for the first device 110*a* to make a handover determination. This priority message may cause the first device to evaluate whether a handover should be performed, which may include, for example, a comparison of the signal quality values for the second connection 114*b* and the third connection 114*c*, and potentially lead to a triggered handover 520.

As can be appreciated, either the first device 110*a*, the second device 110*b*, or both may perform an analysis of the first connection 114*a* as described herein to lead to the handover analysis as described herein, particularly as it relates to FIG. 1 and FIG. 5. It may be desirable to perform these operations using both earbuds as certain operating conditions may result in each perceiving a slightly different signal quality with regard to the first connection 114*a*.

The thresholds described herein, such as the signal quality threshold value and rate threshold value, may be determined based on desired system operation and may be configurable/adjustable.

FIG. 7 is a block diagram conceptually illustrating a first device 110*a* or second device 110*b* that may be used with the described system. FIG. 8 is a block diagram conceptually illustrating a third device 112 that may be used with the described system. FIG. 9 is a block diagram conceptually illustrating example components of a remote device 120 that may assist with ASR, NLU processing, command processing, or the like. Multiple such devices 120 may be included in the system, such as one remote device(s) 120 for network provisioning, one server(s) for performing ASR, one remote device(s) 120 for performing NLU, etc. In operation, each of these devices (or groups of devices) may include computer-readable and computer-executable instructions that reside on the respective device (110*a*/110*b*/112/120), as will be discussed further below.

Each of these devices (110*a*/110*b*/112/120) may include one or more controllers/processors (314/804/904), which may each include a central processing unit (CPU) for processing data and computer-readable instructions and a memory (316/806/906) for storing data and instructions of the respective device. The memories (316/806/906) may individually include volatile random-access memory (RAM), non-volatile read-only memory (ROM), non-volatile magnetoresistive (MRAM) memory, and/or other types of memory. Each device may also include a data-storage component (708/808/908), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1002/802/902).

Computer instructions for operating each device (110*a*/110*b*/112/120) and its various components may be executed by the respective device's controller(s)/processor(s) (314/804/904), using the memory (316/806/906) as temporary "working" storage at runtime. A device's computer instructions may be stored in a non-transitory manner in non-volatile memory (316/806/906), storage (708/808/908), or an external device(s). Alternatively, some or all of the executable instructions may be embedded in hardware or firmware on the respective device in addition to or instead of software.

Each device (110*a*/110*b*/112/120) includes input/output device interfaces (1002/802/902). A variety of components may be connected through the input/output device interfaces, as will be discussed further below. Additionally, each device (110*a*/110*b*/112/120) may include an address/data bus (724/824/924) for conveying data among components of the respective device. Each component within a device (110*a*/110*b*/112/120) may also be directly connected to other components in addition to (or instead of) being connected to other components across the bus (724/824/924).

For example, via the antenna 310/814, the input/output device interfaces 1002/802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to the devices 110*a*/110*b*/112 of FIGS. 10 and 11, the devices 110*a*/110*b*/112 may also include input/output device interfaces 712/1112 that connect to a variety of components, such as an audio output component like a loudspeaker 302/860 or other component capable of outputting audio. The device 110*a*/110*b*/112 may also include an audio capture component which may be, for example, a microphone 304/850 or array of microphones. The microphone 304/850 may be configured to capture audio. The microphones 304/850 may be used to determine an approximate distance to a sound's point of origin; acoustic localization, based on time and/or amplitude differences between sounds captured by different microphones of the array, i.e., beam forming, may be performed. The device 110a/110b/112 (using microphone 304/850, wakeword-detection component 232, ASR component 250, etc.) may be configured to determine audio data corresponding to detected audio. The device 110a/110b/112 (using input/output device interfaces 1002/802, antenna 310/814, etc.) may also be configured to transmit the audio data to server 120 for further processing or to process the data using internal components such as a wakeword-detection component 232. As a way of indicating to a user that a wireless connection to another device has been created, the device 110a/110b/112 may be configured with a visual indicator, such as an LED or similar component, that may change color, flash, or otherwise provide visual indications by the device 110a/110b/112. The device 112 may include a display 818, which may comprise a touch interface 819.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and remote device 120, as illustrated in FIGS. 10, 11, and 12, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

As illustrated in FIG. 10 multiple devices may contain components of the system and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Audio devices 110a/110b may similarly be connected to the remote device(s) 120 either directly or via a network connection to one or more of the local devices. The audio devices 110a/110b may capture audio using one or more microphones or other such audio-capture devices; the audio devices 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
communicating, by a first wireless earbud, with a second wireless earbud over a first wireless connection, wherein the first wireless earbud and the second wireless earbud are part of an earbud pair;
communicating, by the first wireless earbud, with a mobile device over a second wireless connection, wherein the first wireless earbud acts as a primary earbud to manage communication between the mobile device and the earbud pair;
determining, by the first wireless earbud, a first value representing a first signal quality metric of the first wireless connection;
determining that the first value is less than a first threshold value;

in response to the first value being less than the first threshold value, determining a second value representing a first rate of change of the first signal quality metric for the first wireless connection;

determining that the second value is less than a second threshold value;

determining a fourth value representing a measurement of the first signal quality metric for the second wireless connection;

receiving, by the first wireless earbud and from the second wireless earbud, a fifth value representing a measurement of the first signal quality metric for a third wireless connection between the second wireless earbud and the mobile device;

determining, based on the fourth value and the fifth value, that the third wireless connection is better than the second wireless connection; and causing the second wireless earbud to act as the primary earbud, wherein the second wireless earbud manages communication between the mobile device and the earbud pair.

2. The computer-implemented method of claim 1, further comprising, by the second wireless earbud:

determining a sixth value representing a second signal quality of the first wireless connection;

determining the sixth value is less than the first threshold value;

in response to the sixth value being less than the first threshold value, determining a seventh value representing a second rate of change of signal quality of the first wireless connection;

determining the seventh value is less than the second threshold value;

determining the fifth value; and in response to the seventh value being less than the second threshold value, sending to the first wireless earbud the fifth value and an indication to determine if handover is to be performed.

3. The computer-implemented method of claim 1, further comprising, by the first wireless earbud:

determining a first received signal strength indicator (RSSI) value corresponding to the first wireless connection during a first time window;

determining a first packet error rate (PER) value corresponding to the first wireless connection during the first time window;

determining a first audio quality value using the first RSSI value and a first PER value; and determining the first value using the first audio quality value.

4. The computer-implemented method of claim 3, further comprising, by the first wireless earbud:

determining a second audio quality value using a second RSSI value and a second PER value; and determining the second value using the first audio quality value and the second audio quality value.

5. A computer-implemented method comprising:

determining a first value of a signal quality metric of a first wireless connection between a first audio device and a second audio device;

determining that the first value satisfies a first condition;

determining a rate of change of the signal quality metric for the first wireless connection;

determining that the rate of change satisfies a second condition;

determining a second value of the signal quality metric for a second wireless connection between the first audio device and a third device;

determining a third value of the signal quality metric for a third wireless connection between the second audio device and the third device;

processing the second value and the third value to determine the third wireless connection is better than the second wireless connection; and causing a handover, from the first audio device to the second audio device, of responsibility for communication with the third device.

6. The computer-implemented method of claim 5, further comprising:

determining a plurality of values of the signal quality metric corresponding to the first wireless connection;

calculating a first average value based at least in part on the plurality of values; and determining the first value using the first average value.

7. The computer-implemented method of claim 6, wherein determining the first value satisfies the first condition comprises determining the first average value is less than a signal quality threshold value.

8. The computer-implemented method of claim 6, further comprising:

determining a fourth value of the signal quality metric for the first wireless connection;

storing the fourth value in a buffer; and retrieving the plurality of values from the buffer, the plurality of values including the fourth value.

9. The computer-implemented method of claim 8, further comprising:

processing the plurality of values to determine the rate of change.

10. The computer-implemented method of claim 5, wherein determining the first value satisfies the first condition and determining the rate of change satisfies the second condition are performed by the second audio device, and wherein the method further comprises, by the second audio device:

sending, to the first audio device, a handover request and data representing a second signal quality of the third wireless connection.

11. The computer-implemented method of claim 5, further comprising:

determining a first received signal strength indicator (RSSI) value corresponding to the first wireless connection during a first time window;

determining a first packet error rate (PER) value corresponding to the first wireless connection during the first time window; and determining the first value using the first RSSI value and a first PER value.

12. The computer-implemented method of claim 11, further comprising:

determining a fourth value using the first RSSI value and the first PER value;

determining a second RSSI value corresponding to the first wireless connection during a second time window prior to the first time window;

determining a second PER value corresponding to the first wireless connection during the second time window;

determining a fifth value using the second RSSI value and the second PER value;

determining an average value using at least the fourth value and the fifth value; and determining the first value using the average value.

13. A system comprising:
at least one processor; and
at least one memory including instructions that, when executed by the at least one processor, cause the system to:
  determine a first value of a signal quality metric of a first wireless connection between a first audio device and a second audio device;
  determine that the first value satisfies a first condition;
  determine a rate of change of the signal quality metric for the first wireless connection;
  determine that the rate of change satisfies a second condition;
  determine a second value of the signal quality metric for a second wireless connection between the first audio device and a third device;
  determine a third value of the signal quality metric for a third wireless connection between the second audio device and the third device;
  determine the second value and the third value to determine the third wireless connection is better than the second wireless connection; and
  cause a handover, from the first audio device to the second audio device, of responsibility for communication with the third device.

14. The system of claim 13, wherein the at least one memory further includes instructions that, when executed by the at least one processor, further cause the system to:
  determine a plurality of values of the signal quality metric corresponding to the first wireless connection;
  calculate a first average value based at least in part on the plurality of values; and
  determine the first value using the first average value.

15. The system of claim 14, wherein the instructions that cause the system to determine the first value satisfies the first condition comprise instructions that, when executed by the at least one processor, further cause the system to determine the first average value is less than a signal quality threshold value.

16. The system of claim 14, wherein the at least one memory further includes instructions that, when executed by the at least one processor, further cause the system to:
  determine a fourth value of the signal quality metric for the first wireless connection;
  store the fourth value in a buffer; and
  retrieve the plurality of values from the buffer, the plurality of values including the fourth value.

17. The system of claim 16, wherein the at least one memory further includes instructions that, when executed by the at least one processor, further cause the system to:
  process the plurality of values to determine the rate of change.

18. The system of claim 13, wherein the instructions that cause the system to determine the first value satisfies the first condition and determine the rate of change satisfies the second condition are executed by the second audio device, and wherein the at least one memory further includes instructions that, when executed by the at least one processor, further cause the second audio device to:
  send, to the first audio device, a handover request and data representing a second signal quality of the third wireless connection.

19. The system of claim 13, wherein the at least one memory further includes instructions that, when executed by the at least one processor, further cause the system to:
  determine a first received signal strength indicator (RSSI) value corresponding to the first wireless connection during a first time window;
  determine a first packet error rate (PER) value corresponding to the first wireless connection during the first time window; and
  determine the first value using the first RSSI value and a first PER value.

20. The system of claim 19, wherein the at least one memory further includes instructions that, when executed by the at least one processor, further cause the system to:
  determine a fourth value using the first RSSI value and the first PER value;
  determine a second RSSI value corresponding to the first wireless connection during a second time window prior to the first time window;
  determine a second PER value corresponding to the first wireless connection during the second time window;
  determine a fifth value using the second RSSI value and the second PER value;
  determine an average value using at least the fourth value and the fifth value; and
  determine the first value using the average value.

* * * * *